US012671986B2

(12) United States Patent
Lee et al.

(10) Patent No.: US 12,671,986 B2
(45) Date of Patent: Jun. 30, 2026

(54) ACQUIRING CIPHER KEYS FOR POSITIONING SYSTEM INFORMATION BLOCKS

(71) Applicant: QUALCOMM Incorporated, San Diego, CA (US)

(72) Inventors: Kuo-Chun Lee, San Diego, CA (US); Arvind Vardarajan Santhanam, San Diego, CA (US); Shanshan Wang, San Diego, CA (US); Liangchi Hsu, San Diego, CA (US); Abhishek Bhatnagar, San Diego, CA (US); Prashanth Mysore, San Diego, CA (US); Priya Rajan, Hillsborough, NJ (US); Karthik Venkatram, San Diego, CA (US); Daniel Amerga, San Diego, CA (US); Osama Lotfallah, San Diego, CA (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 18/187,074

(22) Filed: Mar. 21, 2023

(65) Prior Publication Data

US 2024/0323677 A1      Sep. 26, 2024

(51) Int. Cl.
*H04W 12/037* (2021.01)
*H04L 9/06* (2006.01)
(Continued)

(52) U.S. Cl.
CPC ......... *H04W 12/037* (2021.01); *H04L 9/0618* (2013.01); *H04L 9/0819* (2013.01);
(Continued)

(58) Field of Classification Search
CPC .. H04W 12/037; H04W 12/61; H04L 9/0618; H04L 9/0819; H04L 9/0891; H04L 9/16
(Continued)

(56) References Cited

U.S. PATENT DOCUMENTS

| | | | |
|---|---|---|---|
| 8,973,108 B1* | 3/2015 | Roth | G06F 21/00 726/28 |
| 10,437,968 B2* | 10/2019 | Hensgen | H04L 9/0861 |

(Continued)

FOREIGN PATENT DOCUMENTS

| | | |
|---|---|---|
| WO | 2022010626 | 1/2022 |

OTHER PUBLICATIONS

ETSI MCC: "Report of 3GPP TSG RAN2#101 Meeting, Athens, Greece", 3GPP TSG-RAN WG2 meeting #101, R2-1804201, 3rd Generation Partnership Project, Mobile Competence Centre, 650, Route Des Lucioles, F-06921 Sophia-Antipolis Cedex, France, vol. RAN WG2, No. Sanya, China, Apr. 16, 2018-Apr. 20, 2018, Apr. 15, 2018, pp. 1-250, XP051435801, Section 9.8.5: Broadcasting of assistance data.

(Continued)

*Primary Examiner* — Thanh T Le
(74) *Attorney, Agent, or Firm* — QUALCOMM Incorporated

(57) ABSTRACT

Techniques are provided for receiving encrypted positioning assistance data, requesting and obtaining cipher keys to decrypt the positioning assistance data. An example method for transmitting a cipher key request includes receiving cipher key information including a start time value, a duration value, and an advance time value, determining an advance time duration that is equal to a sum of the start time value and the duration value minus the advance time value, and transmitting the cipher key request within the advance time duration.

28 Claims, 21 Drawing Sheets

(51) Int. Cl.
*H04L 9/08* (2006.01)
*H04L 9/16* (2006.01)
*H04W 12/61* (2021.01)

(52) U.S. Cl.
CPC .............. *H04L 9/0891* (2013.01); *H04L 9/16* (2013.01); *H04W 12/61* (2021.01)

(58) Field of Classification Search
USPC ........................................................ 380/270
See application file for complete search history.

(56) References Cited

U.S. PATENT DOCUMENTS

| | | | | |
|---|---|---|---|---|
| 2012/0017090 A1* | 1/2012 | Gould | ...................... | H04L 63/08 |
| | | | | 713/176 |
| 2016/0119291 A1* | 4/2016 | Zollinger | .............. | H04L 63/061 |
| | | | | 713/171 |
| 2017/0141916 A1* | 5/2017 | Zhang | ................... | H04L 9/0894 |
| 2018/0324740 A1* | 11/2018 | Edge | ...................... | H04W 64/00 |
| 2019/0268725 A1* | 8/2019 | Edge | ...................... | H04W 4/029 |
| 2019/0319966 A1* | 10/2019 | Holt | ........................ | G06Q 20/40 |
| 2020/0107189 A1* | 4/2020 | Sharma | ..................... | H04L 9/12 |
| 2020/0120578 A1* | 4/2020 | Shreevastav | .......... | H04W 12/03 |
| 2020/0374690 A1* | 11/2020 | Yao | ................... | H04W 36/0033 |
| 2020/0404553 A1* | 12/2020 | Lovlekar | ........... | H04W 36/0038 |
| 2021/0051559 A1* | 2/2021 | Edge | ........................ | H04W 8/12 |
| 2021/0360569 A1* | 11/2021 | Park | ........................ | H04W 8/02 |
| 2022/0171758 A1* | 6/2022 | Agrawal | .............. | G06F 16/245 |
| 2022/0256337 A1* | 8/2022 | Ohlsson | ................ | H04W 12/63 |
| 2023/0050222 A1* | 2/2023 | Wang | ................. | G06F 21/6263 |
| 2023/0082949 A1* | 3/2023 | Buchan | ................. | H04L 9/3268 |
| | | | | 713/171 |
| 2023/0144714 A1* | 5/2023 | Manolakos | ........... | G01S 5/0236 |
| | | | | 455/456.1 |
| 2023/0188997 A1* | 6/2023 | Li | ..................... | H04W 12/0431 |
| | | | | 713/171 |
| 2023/0344837 A1* | 10/2023 | Maheshwari | ....... | G06F 21/6218 |
| 2024/0031175 A1* | 1/2024 | Nebenzahl | ........... | H04L 9/3247 |
| 2024/0031347 A1* | 1/2024 | Mantha | ................... | H04L 63/08 |
| 2024/0097897 A1* | 3/2024 | Parkkila | ................. | H04L 9/088 |
| 2024/0214472 A1* | 6/2024 | Xu | ...................... | H04L 65/1069 |
| 2024/0305620 A1* | 9/2024 | Prabaharan | ........... | H04L 63/108 |

OTHER PUBLICATIONS

International Search Report and Written Opinion—PCT/US2024/012866—ISA/EPO—May 6, 2024.
International Preliminary Report on Patentability PCT/US2024/012866 the International Bureau of WIPO Geneva, Switzerland Oct. 2, 2025.

* cited by examiner

500

Figure 9A:
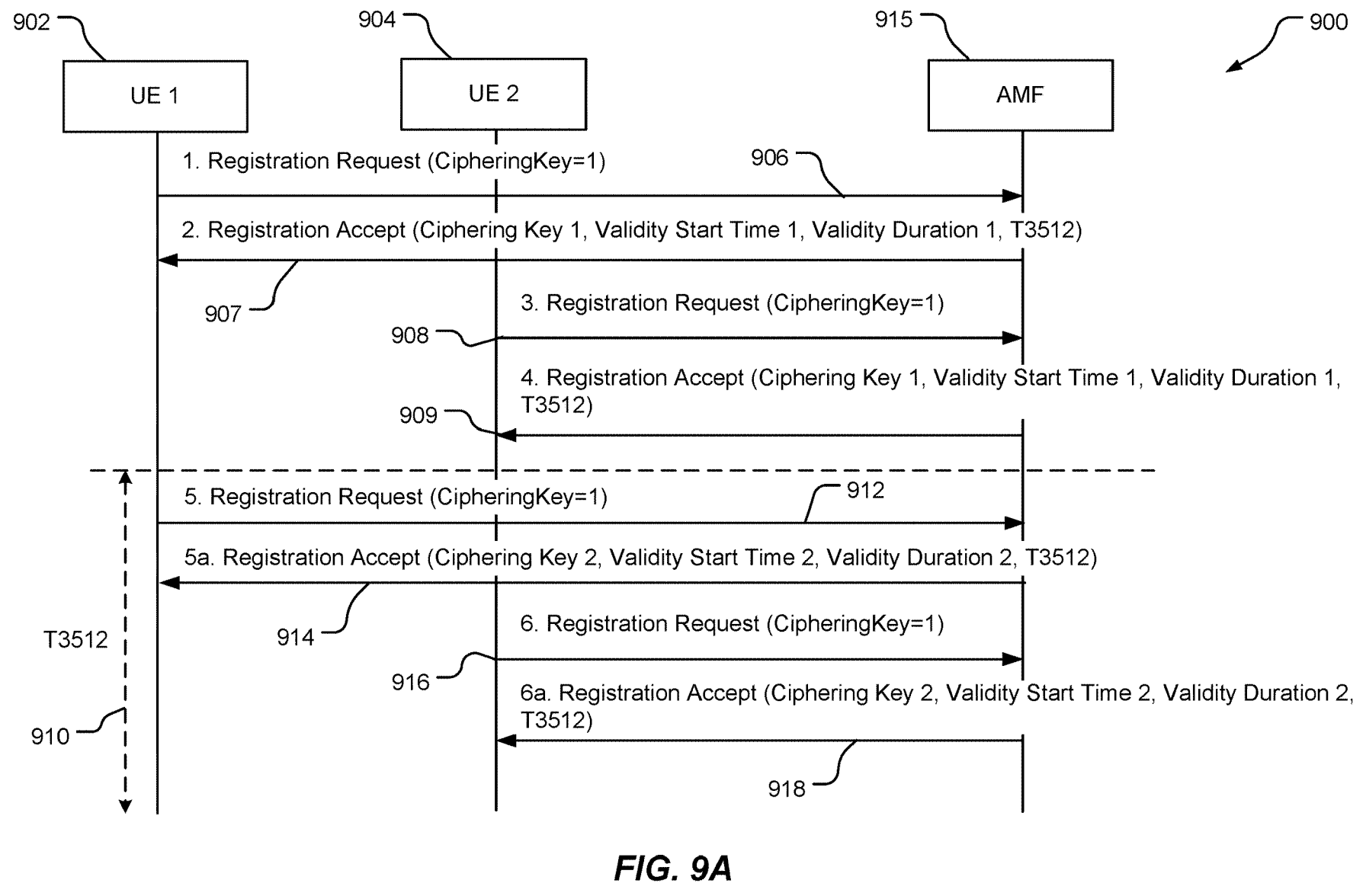

900

915   AMF

904   UE 2

902   UE 1

1. Registration Request (CipheringKey=1)

906

2. Registration Accept (Ciphering Key 1, Validity Start Time 1, Validity Duration 1, T3512)

907

3. Registration Request (CipheringKey=1)

908

4. Registration Accept (Ciphering Key 1, Validity Start Time 1, Validity Duration 1, T3512)

909

912

5. Registration Request (CipheringKey=1)

5a. Registration Accept (Ciphering Key 2, Validity Start Time 2, Validity Duration 2, T3512)

914

6. Registration Request (CipheringKey=1)

916

6a. Registration Accept (Ciphering Key 2, Validity Start Time 2, Validity Duration 2, T3512)

Receive cipher key information including a start time value, a duration value and an advance time value                    1202

Determine an advance time duration that is equal to a sum of start time value and the duration value minus the advance time value                    1204

Transmit a cipher key request within the advance time duration                    1206

1300

Provide cipher key information including a start time value, a duration value and an advance time value to a mobile device                    1302

Receive a cipher key request from the mobile device that is within an advance time duration equal to the sum of start time value and the duration value minus the advance time value                    1304

1400

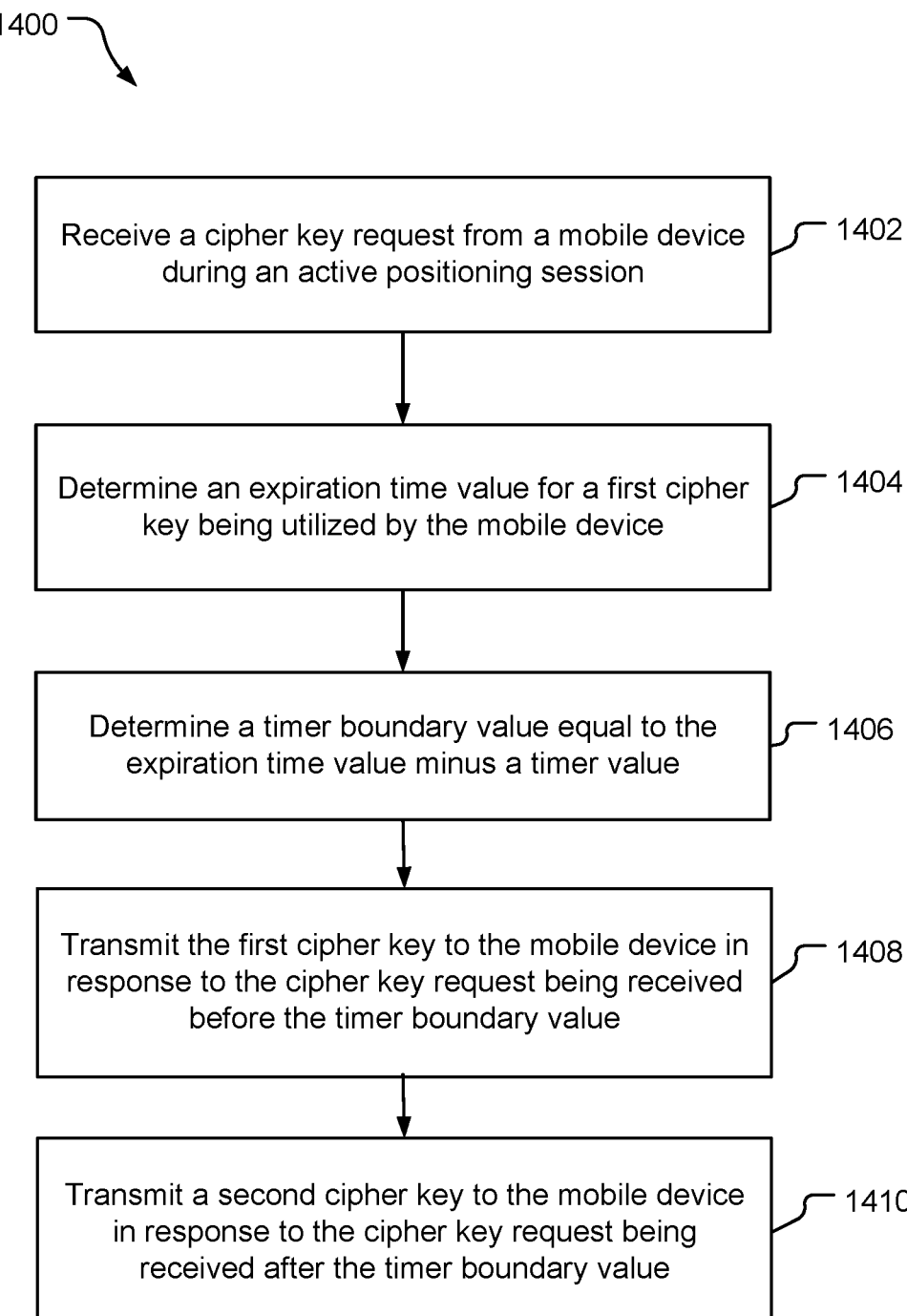

Receive a cipher key request from a mobile device during an active positioning session ⟋ 1402

Determine an expiration time value for a first cipher key being utilized by the mobile device ⟋ 1404

Determine a timer boundary value equal to the expiration time value minus a timer value ⟋ 1406

Transmit the first cipher key to the mobile device in response to the cipher key request being received before the timer boundary value ⟋ 1408

Transmit a second cipher key to the mobile device in response to the cipher key request being received after the timer boundary value ⟋ 1410

*FIG. 14*

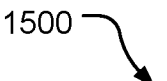
1500
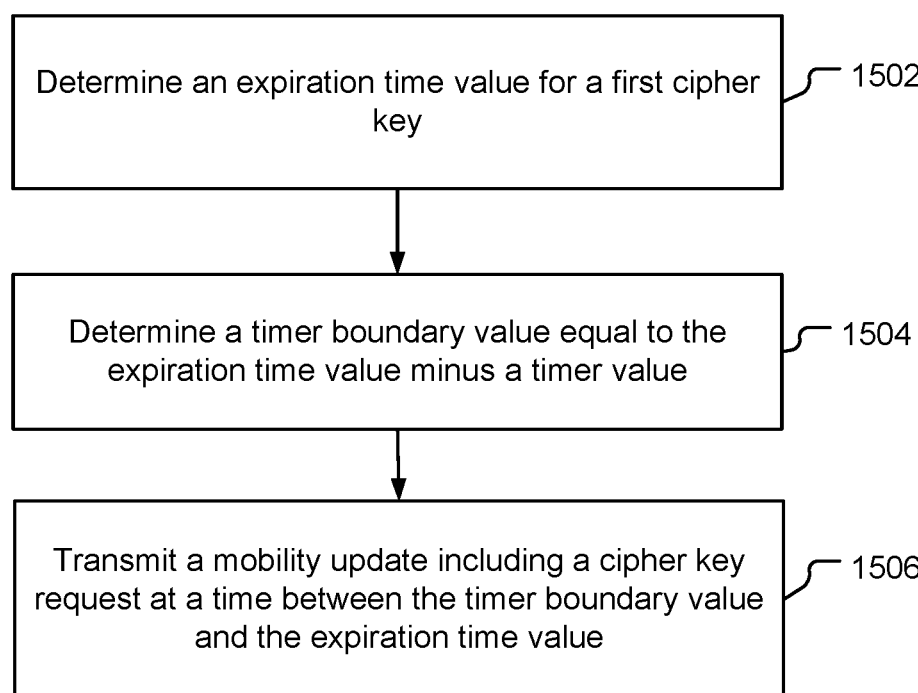
Determine an expiration time value for a first cipher key — 1502
Determine a timer boundary value equal to the expiration time value minus a timer value — 1504
Transmit a mobility update including a cipher key request at a time between the timer boundary value and the expiration time value — 1506
*FIG. 15*

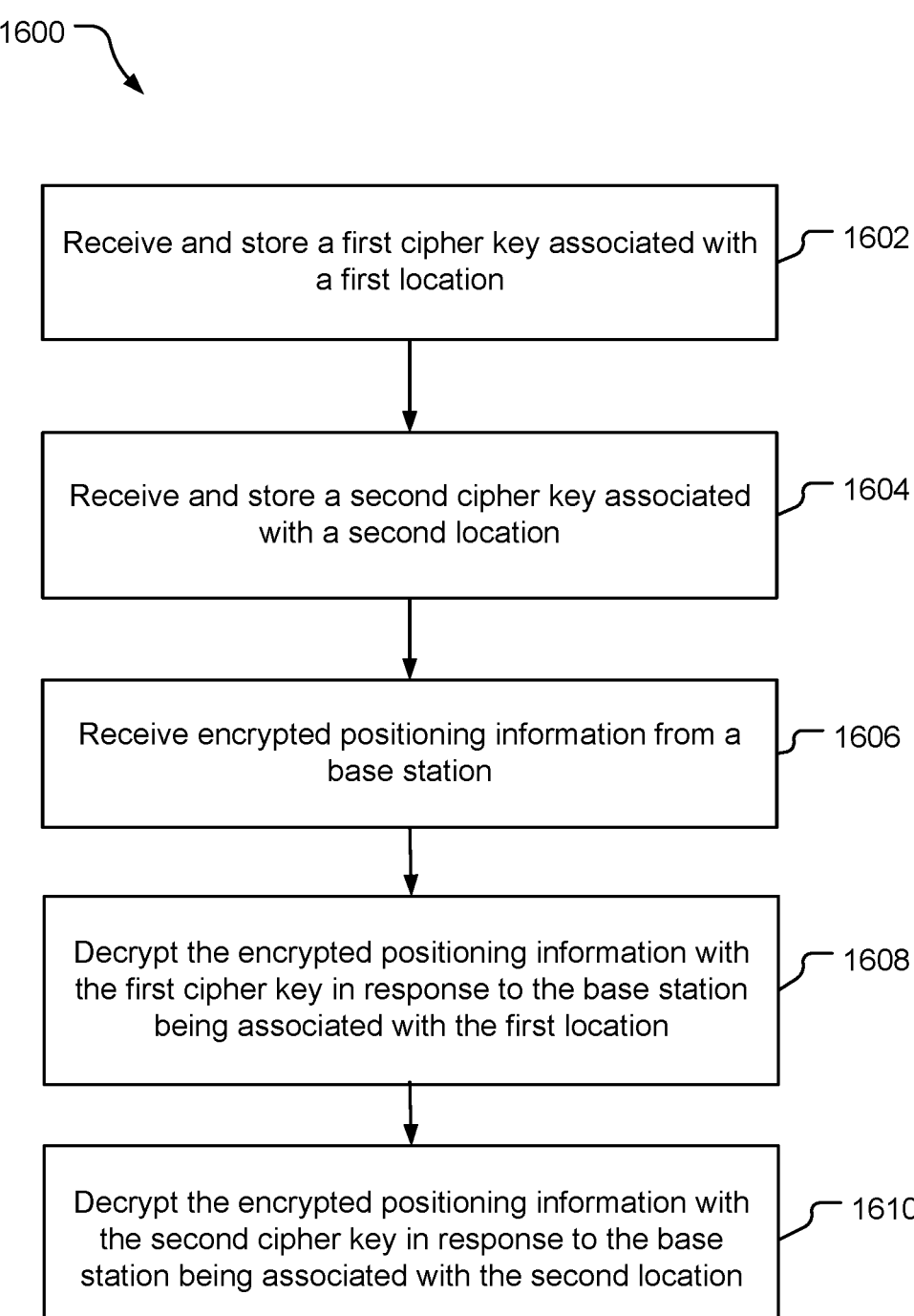

1600

Receive and store a first cipher key associated with a first location — 1602

Receive and store a second cipher key associated with a second location — 1604

Receive encrypted positioning information from a base station — 1606

Decrypt the encrypted positioning information with the first cipher key in response to the base station being associated with the first location — 1608

Decrypt the encrypted positioning information with the second cipher key in response to the base station being associated with the second location — 1610

*FIG. 16*

ACQUIRING CIPHER KEYS FOR POSITIONING SYSTEM INFORMATION BLOCKS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, consumer asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit positioning assistance data to enable a UE to measure satellite and/or terrestrial positioning reference signals. In some use cases, the assistance data may be encrypted and a UE must obtain a cipher key to access the encrypted data.

SUMMARY

An example method for transmitting a cipher key request according to the disclosure includes receiving cipher key information including a start time value, a duration value, and an advance time value, determining an advance time duration that is equal to a sum of the start time value and the duration value minus the advance time value, and transmitting the cipher key request within the advance time duration.

Implementations of such a method may include one or more of the following features. Determining a random time within the advance time duration may be and transmitting the cipher key request based at least in part on the random time. The cipher key information may be received via one or more non-access stratum (NAS) messages. The advance time duration may be equal to a pre-established timer value in a communication system. The pre-established timer value may be based on a T3512 timer. Receiving additional cipher key information in response to transmitting the cipher key request within the advance time duration. The method may further include receiving an encrypted positioning system information block, and decrypting the encrypted positioning system information block based at least in part on the additional cipher key information. Storing the cipher key information in a data structure, and storing the additional cipher key information in the data structure. Transmitting the cipher key request prior to the advance time duration, and receiving the cipher key information including the start time value, the duration value, and the advance time value. The cipher key information may be associated with a tracking area.

An example method for receiving positioning information from a plurality of base stations according to the disclosure includes receiving and storing a first cipher key associated with a first location, receiving and storing a second cipher key associated with a second location, receiving encrypted positioning information from a base station, decrypting the encrypted positioning information with the first cipher key in response to the base station being associated with the first location, and decrypting the encrypted positioning information with the second cipher key in response to the base station being associated with the second location.

Implementations of such a method may include one or more of the following features. The first location may be a first tracking area and the second location may be a second tracking area. The first cipher key may be associated with a first tracking area identity (TAI) and the second cipher key may be associated with a second tracking area identity (TAI). Storing the first cipher key may include storing a first valid start time, a first duration time, a first TAI list, and a first time stamp based on when the first cipher key is received in a data structure, and storing the second cipher key includes storing a second valid start time, a second duration time, a second TAI list, and a second time stamp based on when the second cipher key is received in the data structure. Removing the first cipher key from the data structure based at least in part on the first time stamp, or removing the second cipher key from the data structure based at least in part on the second time stamp.

Items and/or techniques described herein may provide one or more of the following capabilities, as well as other capabilities not mentioned. User equipment may be configured to receive assistance data from network stations in positioning system information blocks (posSIBs). The posSIBs may be encrypted to protect proprietary information such as real time kinematic (RTK) data. The encryption may be based on time and location. User equipment may request a cipher key from a base station, and the base station may provide one or more keys based on the time and location of the base station. A cipher key may be valid for a limited period of time and/or a limited location (e.g., a target area).

The user equipment may request additional cipher keys during a positioning session if a current cipher key expires or the user equipment moves to a new tracking area. The timing information may include one or more advance timers or system timers to avoid signaling storms caused by multiple user equipment requesting new cipher keys when the current cipher key expires. The user equipment may be configured to store multiple cipher keys and timing information associated with different tracking areas. The messaging overhead for requesting and receiving cipher keys may be reduced and signaling storms may be avoided. Other capabilities may be provided and not every implementation according to the disclosure must provide any, let alone all, of the capabilities discussed.

BRIEF DESCRIPTION OF THE DRAWINGS

FIGS. 9A-9C are example message flow and timing diagrams utilizing a system timer in a cipher key request.

FIG. 14 is a process flow diagram for an example method of transmitting cipher key values based on a timer boundary value.

FIG. 15 is a process flow diagram for an example method of transmitting a mobility update including a cipher key request.

FIG. 16 is a process flow diagram for an example method for receiving positioning information from a plurality of base stations.

DETAILED DESCRIPTION

Figure 1:
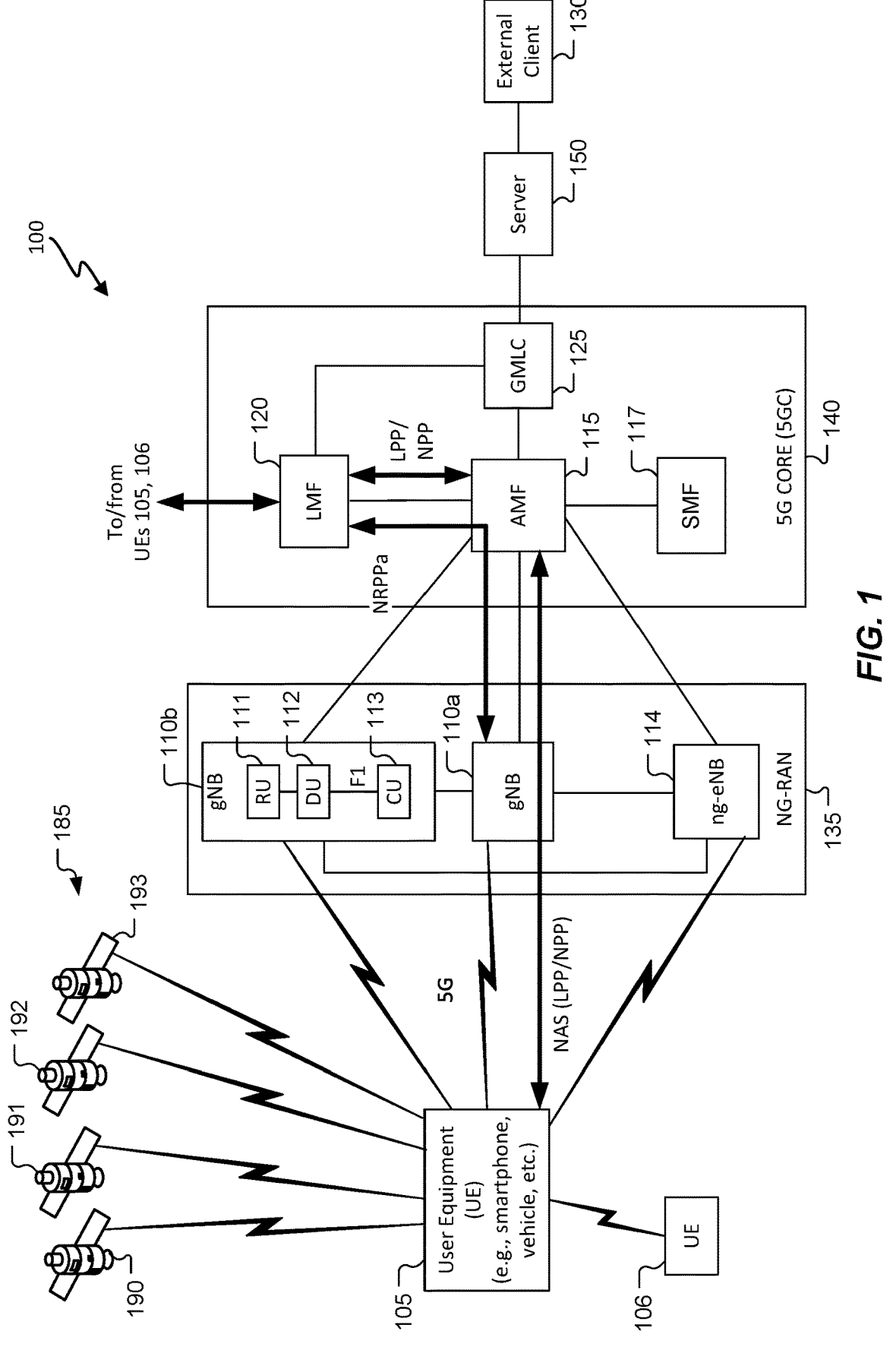
FIG. 1 is a simplified diagram of an example wireless communications system.

Techniques are discussed herein for receiving encrypted positioning assistance data, requesting and obtaining cipher keys to decrypt the positioning assistance data. In some cellular networks, a user equipment (UE) may be configured to receive assistance data for satellite and/or terrestrial positioning techniques via one or more positioning system information blocks (posSIBs) rather than via a unicast connection. The implementation of posSIBs may conserve over-the-air (OTA) bandwidth especially when there are many users attempting to receive assistance data continuously (e.g., in a RTK (Real Time Kinematic) positioning session). A posSIB may be transmitted in a broadcast channel. In some networks, a network may encrypt (e.g., cipher) the posSIBs to allow only subscribers or other authorized UEs to utilize the assistance data. In such a use case, the UE may request and receive ciphering key(s) from the network in order to decipher the posSIBs. In an example, a UE may be configured to utilize a registration request to request and receive a cipher key from the network.

In some networks, posSIB information may be broadcast and UEs may be provided with encryption information to decrypt the posSIBs. In these implementations, however, the validity time for the cipher key may be consistent across all devices in an area. This convergence of validity times may cause network flooding around the expiration of that validity time (e.g., signaling storms), and since a cipher key may be identical for all UEs in a target area, when a UE moves between different target areas the UE may make repeated requests to receive keys for each of the target areas. In the techniques provided herein, in an example, a network resource (e.g., location server, mobility management server, etc.) may be configured to indicate an advance time in a cipher key registration accept message, and the receiving UE may be configured to randomly pre-request a ciphering key if a position session is still active within the advance time prior to expiration of the cipher key's validity time period. The network resource may be configured to provide the current cipher key of the request from the UE is made outside (e.g., prior to) the advance time. The advance time may reduce network flooding at the expiration of a cipher key. In an example, the UE may be configured to make a ciphering key request in every periodic and mobility update when a positioning session is still active, and a network resource may be configured to provide a new cipher key only within the duration of a T3512 timer ahead of the expiration of the current cipher key. In an example, a UE may be configured to store multiple keys for multiple target area identity (TAI) lists (e.g., geographic areas). These techniques are examples and other configurations and messaging, however, may be used.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
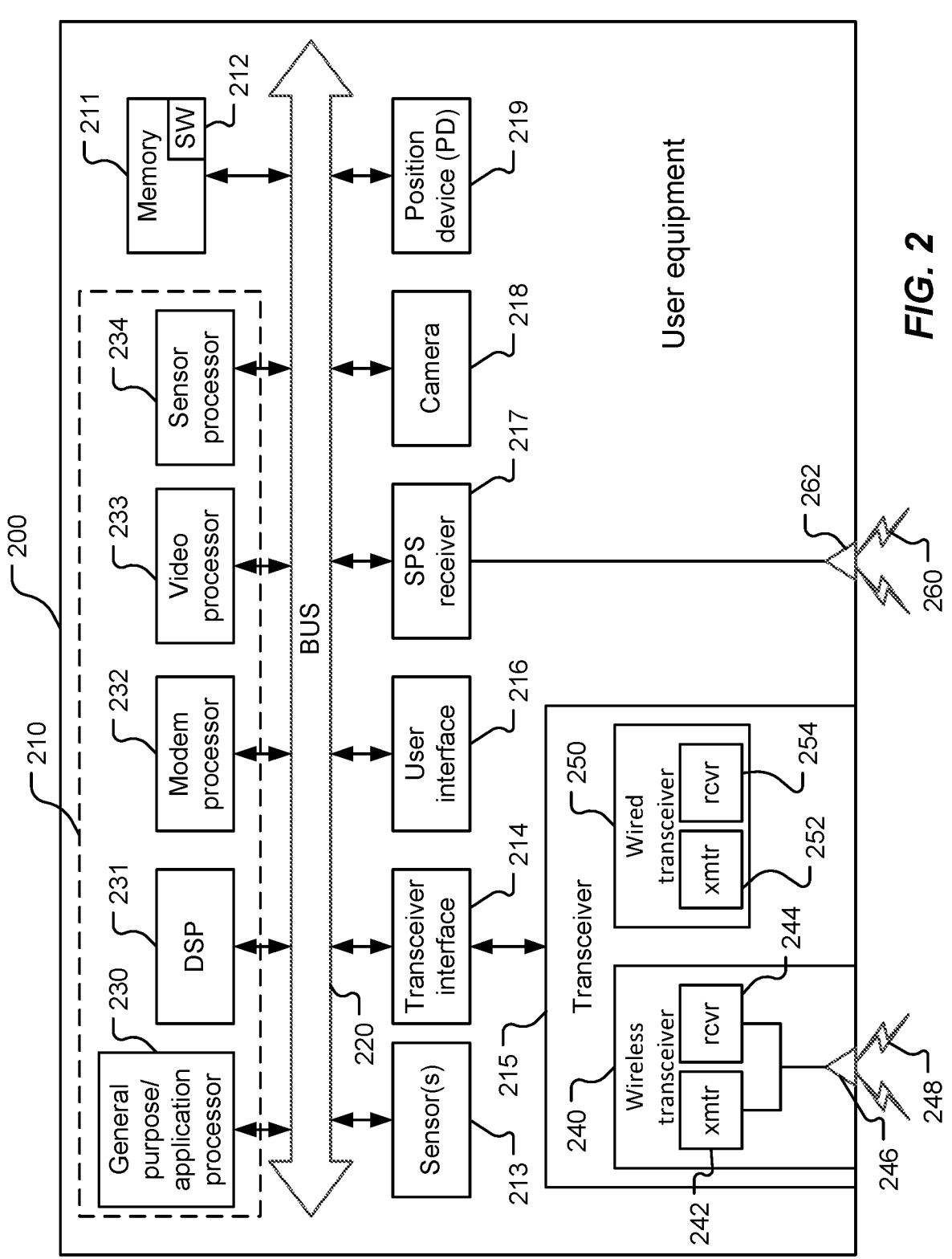
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
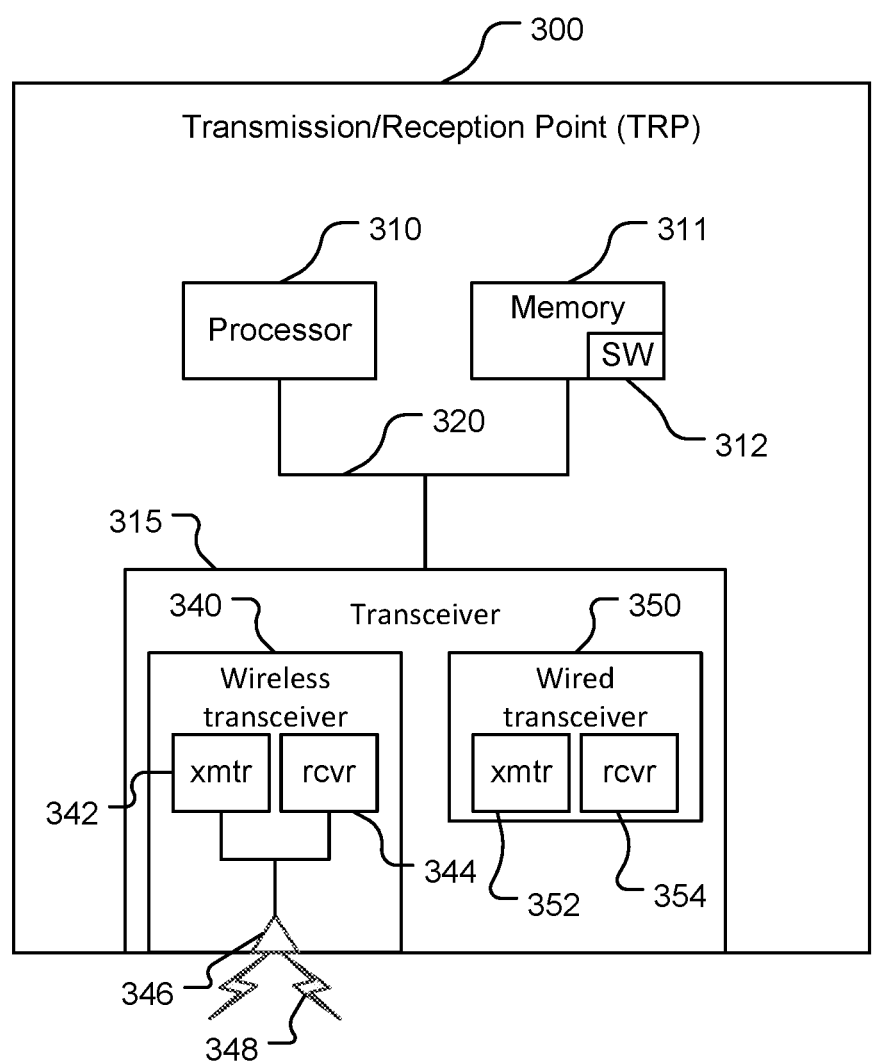
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
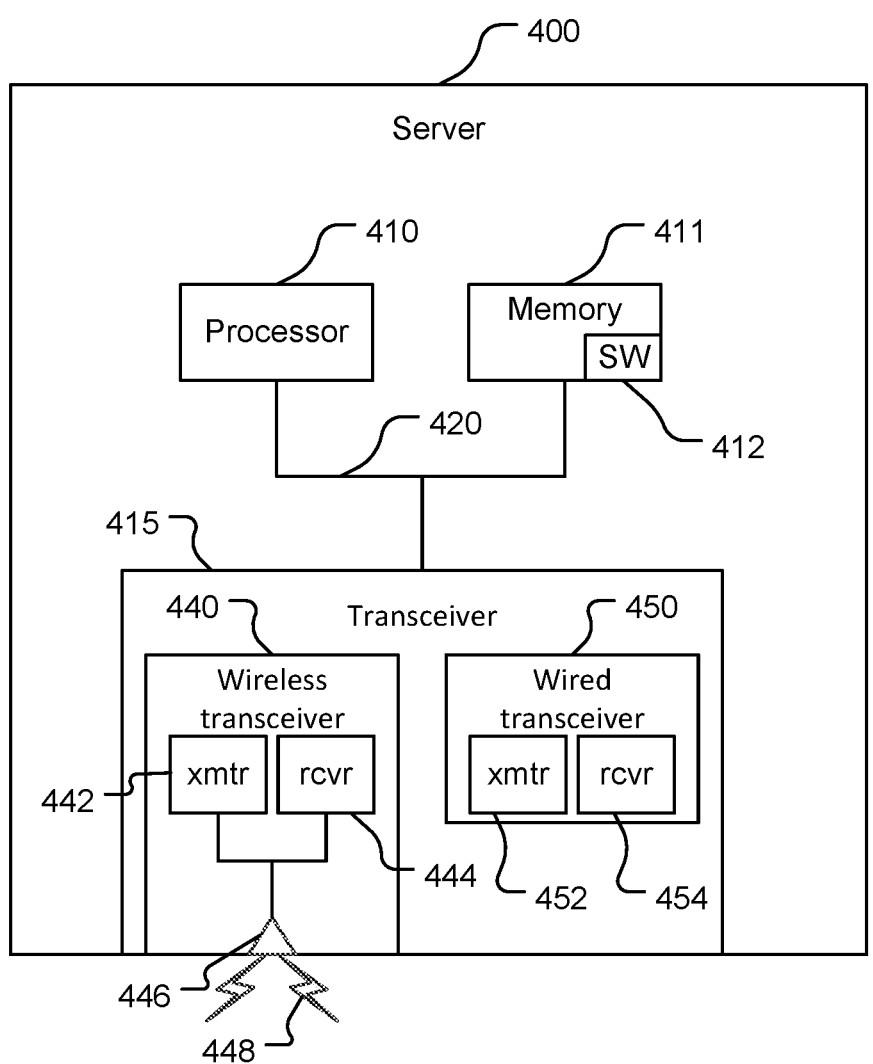
FIG. 4 is a block diagram of components of a server, various examples of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
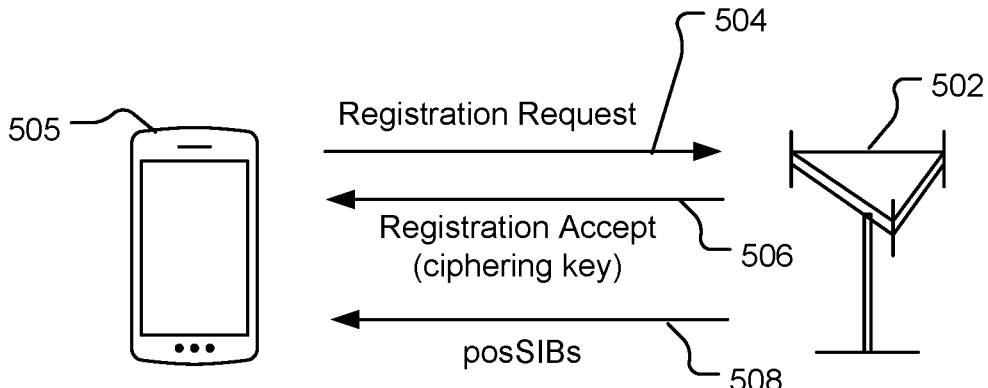
FIG. 5 is an example message flow between a user equipment and a transmission/reception point.

Referring to FIG. 5, an example message flow 500 between a UE 505 and a TRP 502 is shown. The UE 505 may include some or all of the components of the UE 200, and the UE 200 is an example of the UE 505. The TRP 502 includes all or some of the components of the TRP 300, and the TRP 300 is an example of the TRP 502. In an example, the TRP 502 is a network base station such as the gNB 110*a*. In an example, the UE 505 may receive GNSS assistance data (or assistance data for terrestrial navigation techniques) from one or more positioning SIBs 508 (posSIBs), rather than via a unicast connection. The posSIBs may conserve bandwidth in device dense networks, particularly when there are many devices utilizing GNSS assistance data continuously (e.g., in a RTK session). The posSIBs 508 may be Radio Resource Control (RRC) based messaging and may be transmitted in a broadcast channel. To enable the posSIBs 508 to be received only by legitimate devices, a communication network (e.g., the communication system 100) may be configured to encrypt the posSIBs 508. The UE 505 may be configured to perform a registration procedure including transmitting a registration request message 504 and receiving a registration accept message 506 including the required ciphering key. In an example, the registration request message 504 may utilize the NAS protocol and may include an information element (IE) with a parameter CipherKey=1. In response to receiving the IE, the network (e.g., the AMF 115) may be configured to send the registration accept message 506 including one or more ciphering key(s) to enable the UE 505 to decode the subsequently transmitted ciphered posSIBs 508. For example, the registration accept message 506 may include a ciphering data set IE which includes a ciphering key, associated with the posSIBs 508, and a validity time (e.g., a start time and a duration) and a Tracking Area Identity (TAI) list where the ciphering key may be used.

Figure 6A:
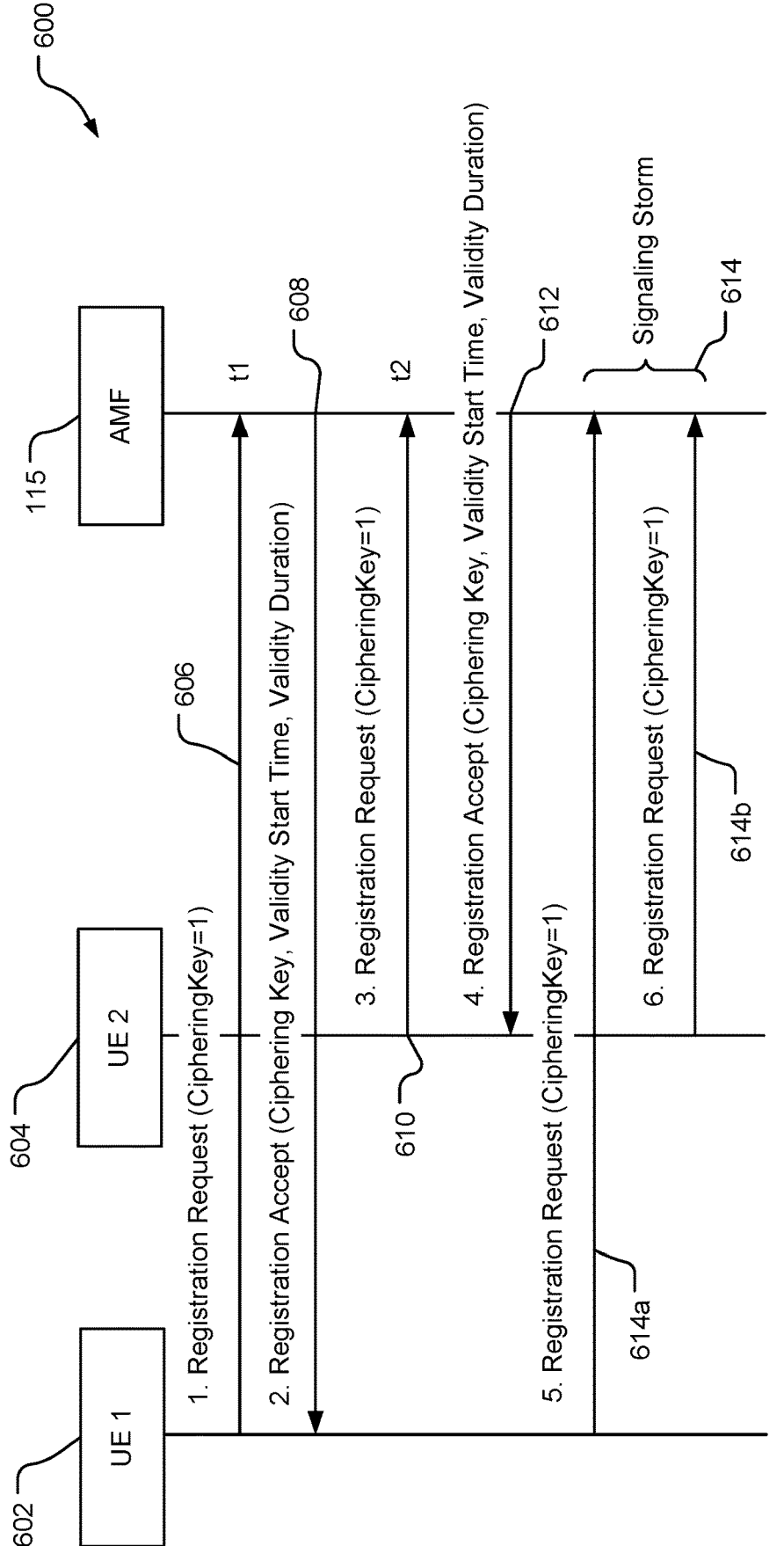
FIGS. 6A and 6B are example message flow and timing diagrams for a prior art cipher key request.
Figure 6B:
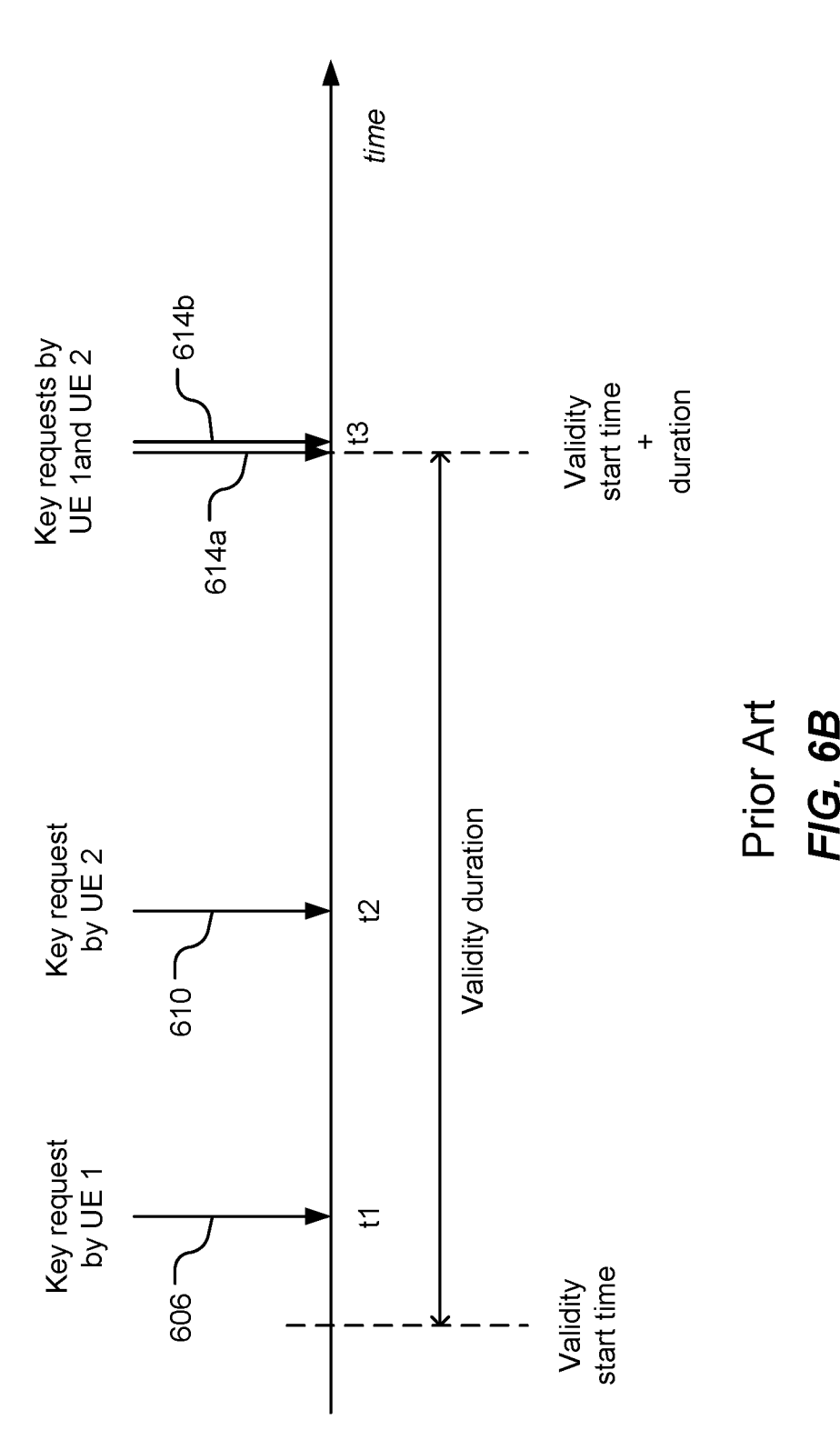

Referring to FIGS. 6A and 6B, an example message flow 600 and a timing diagram 650 for a prior art cipher key request are shown. In the message flow 600, a first UE 602 and a second UE 604 are in the same tracking area and require cipher keys from the AMF 115 to decode the posSIBs associated with the TAI. The ciphering key may be identical and valid in the same time for all the UEs in the valid TAI list. When the key is expiring, all UEs can send request to get the new key to continue positioning sessions simultaneously, thereby causing substantial signaling load to the network, particularly at the AMF 115. For example, at time t1, the first UE 602 sends a registration request message 606 with an IE to indicate that a cipher key is required (e.g., CipheringKey=1). The AMF 115 responds with a registration accept message 608 including the ciphering key, a validity start time, and a validity duration. At time t2, the second UE 604 sends a registration request message 610 with an IE to indicate that a cipher key is required (e.g., CipheringKey=1). The AMF 115 responds with a registration accept message 612 including the ciphering key, a validity start time, and a validity duration. As depicted in the timing diagram 650 in FIG. 6B, at time t3 (e.g., when the ciphering key expires), both the first UE 602 and the second UE 604 create a signaling storm 614 by simultaneously sending respective registration request messages 614*a*, 614*b* to request a new cipher key from the AMF 115.

Figure 7A:
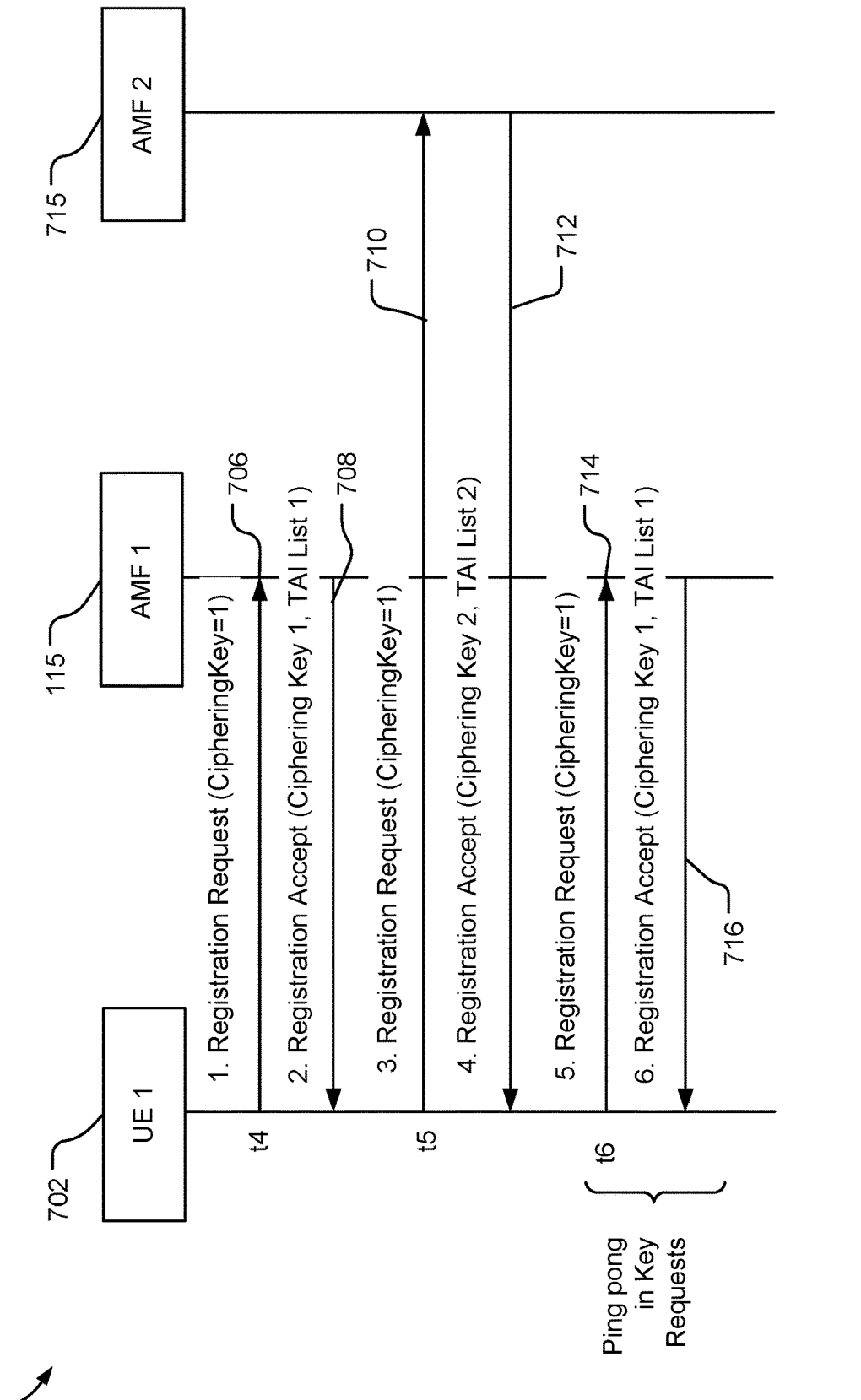
FIGS. 7A and 7B are example message flow and cell diagrams for a prior art cipher key request in neighboring tracking areas.
Figure 7B:
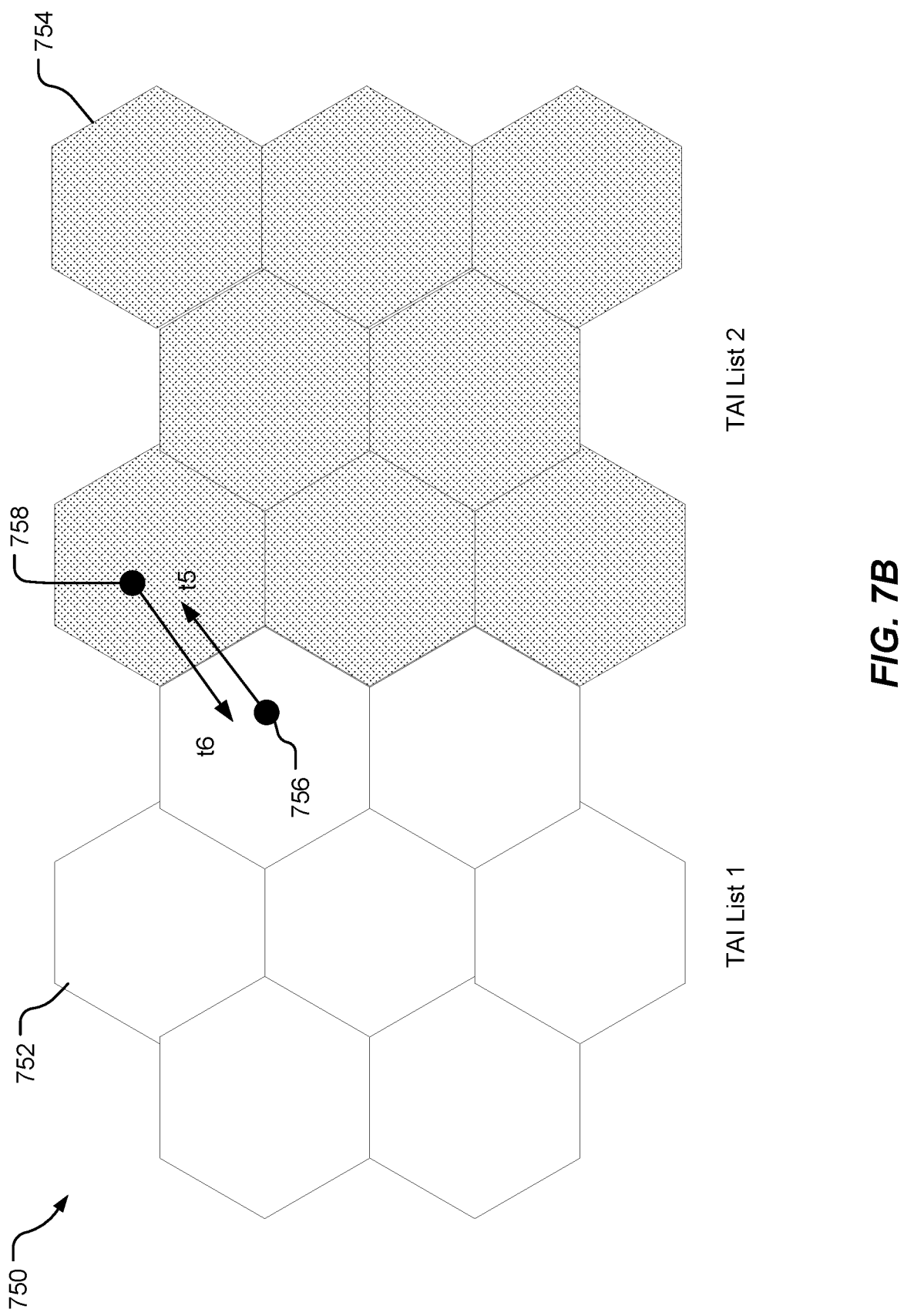

Referring to FIGS. 7A and 7B, an example message flow 700 and cell diagram 750 for a prior art cipher key request in neighboring tracking areas are shown. The message flow 700 includes a UE 702, a first AMF 115 (associated with a first tracking area 752), and a second AMF 715 (associated with a second tracking area 754). When the UE 702 has back-and-forth mobility in neighbor TAIs (e.g., the first and second tracking areas 752, 754) with different keys, the UE 702 may continue to send requests to receive the ciphering keys, which may cause the key requests to ping-pong. For example, at time t4, the UE 702 may be at a first location 756 in the first tracking area 752 and may send a registration request message 706. The first AMF 115 may provide a registration accept message 708 with the cipher key associated with the first tracking area 752. At time t5, the UE 702 may move to a second location 758 in the second tracking area 754 and may send a registration request message 710 to the second AMF 715. The second AMF 715 may send a registration accept message 712 with a cipher key associated with the second tracking area 754. At time t6, the UE 702 may move back to the first tracking area 752 and send another registration request message 714, and the first AMF 115 may send a registration accept message 716 with the cipher key associated with the first tracking area 752. The ping-ponging of the cipher keys may needlessly utilize excess OTA bandwidth. The ping-ponging of FIGS. 7A and 7B may also occur when the UE 702 is located on a cell boundary and the network mobility processes may perform a hand-off procedure based on channel conditions or other factors which may cause the network to register the UE 702 in one tracking area or another.

Figure 8A:
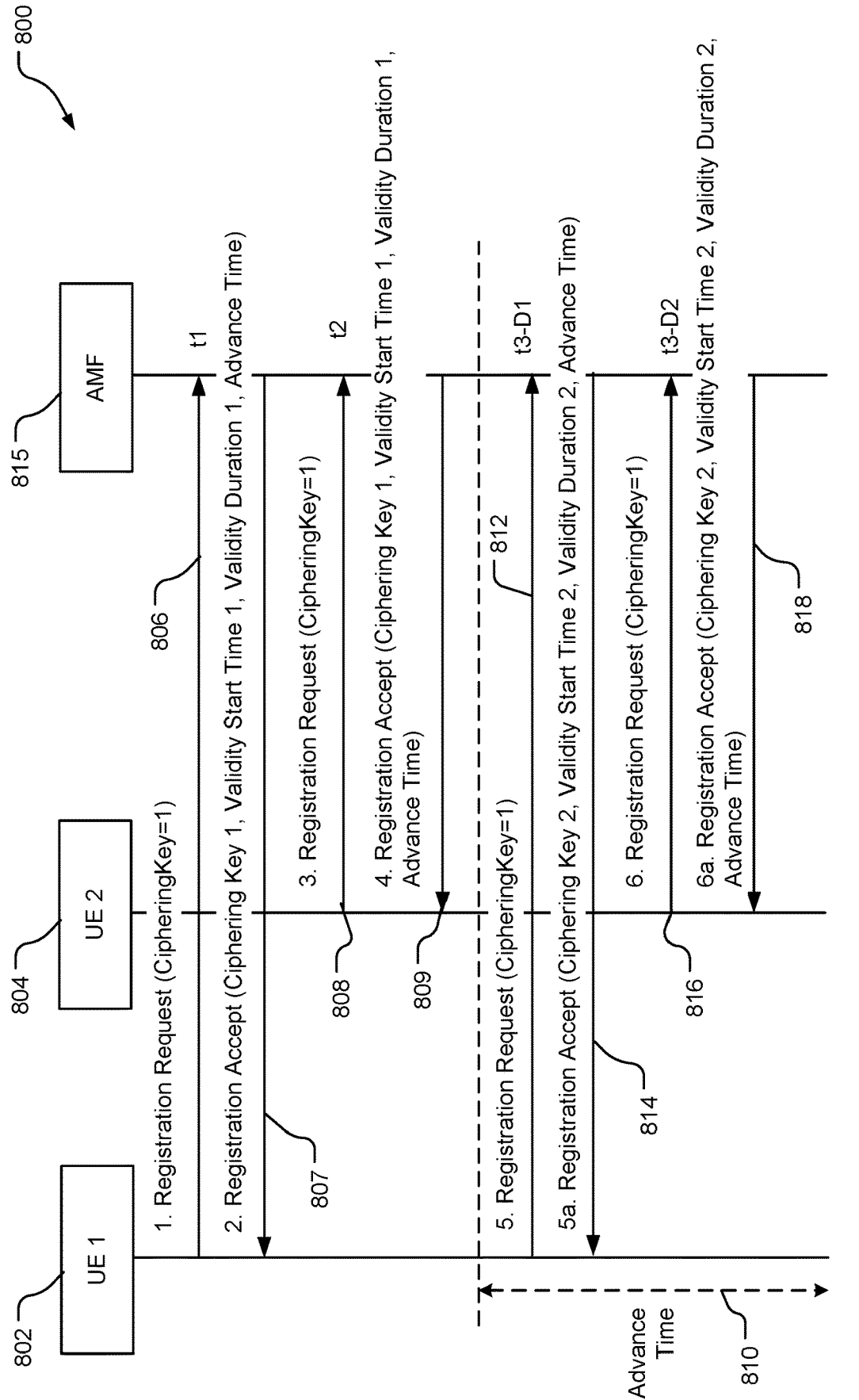
FIGS. 8A and 8B are example message flow and timing diagrams utilizing an advance time period in a cipher key request.
Figure 8B:
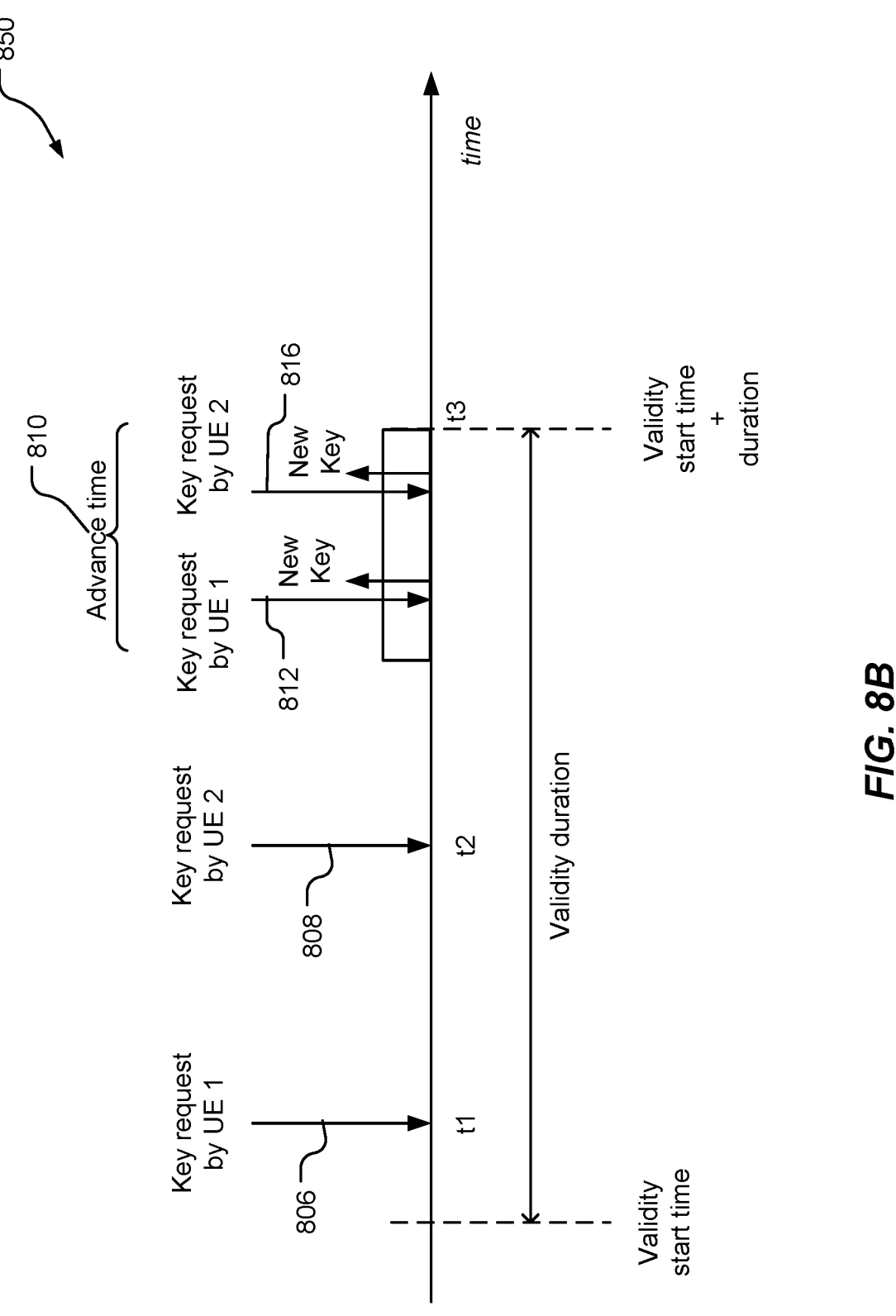

Referring to FIGS. 8A and 8B, an example message flow 800 and timing diagram 850 utilizing an advance time period in a cipher key request are shown. In an example, a network resource (e.g., the AMF 115) in the communication system 100 may include an advance time parameter in the registration accept message. A UE may be configured to randomly pre-request a ciphering key if a position session is still active, and the time is within the Advance time prior to expiration of the cipher key (e.g., the validity start time plus the duration value). The AMF 115 may be configured to send a new cipher key within the advance time ahead of the current cipher key expiry. The AMF 115 may also provide the current key along with the new cipher key. If a registration request is outside of the advance time, then the AMF 115 may be configured to only send the current key. Since the UEs may spread out the requests for new keys, the signaling storm 614 may be avoided.

In operation, in an example, at time t1 a first UE 802 may send a registration request message 806 to an AMF 815 to indicate that a cipher key is required (e.g., CipheringKey=1). The AMF 815 may respond with a registration accept message 807 including a first cipher key, a first validity start time, a first validity duration, and an indication of an advance time 810. At time t2, a second UE 804 (e.g., that is in the same target area as the first UE 802) may send a registration request 808, and the AMF 815 may respond with a registration accept message 809 including the first cipher key, the first validity start time, the first validity duration, and the indication of the advance time 810. At a time t3-D1, which is a random time within the advance time 810, the first UE 802 may send a registration request message 812 prior to the expiration of the first cipher key. Since the registration request message 812 is received within the advance time 810, the AMF may respond with a registration accept message 814 including a second cipher key, a second validity start time, a second validity duration, and an indication of the associated advance time. The registration accept message 814 may also include the current cipher key. At a time t3-D2, which is also a random time within the advance time 810, the second UE 804 may send a registration request message 816 prior to the expiration of the first cipher key. Since the registration request message 816 is received within the advance time 810, the AMF may respond with a registration accept message 818 including the second cipher key, the second validity start time, the second validity duration, and the indication of the associated advance time. The registration accept message 818 may also include the current cipher key. If the registration request messages 812, 816 arrived outside of the advance time (and before the expiration of the first cipher key), the AMF 815 may be configured to send only the current cipher key information (e.g., the first cipher key, the first validity start time, the first validity duration, and the indication of the advance time 810).

Figure 9B:
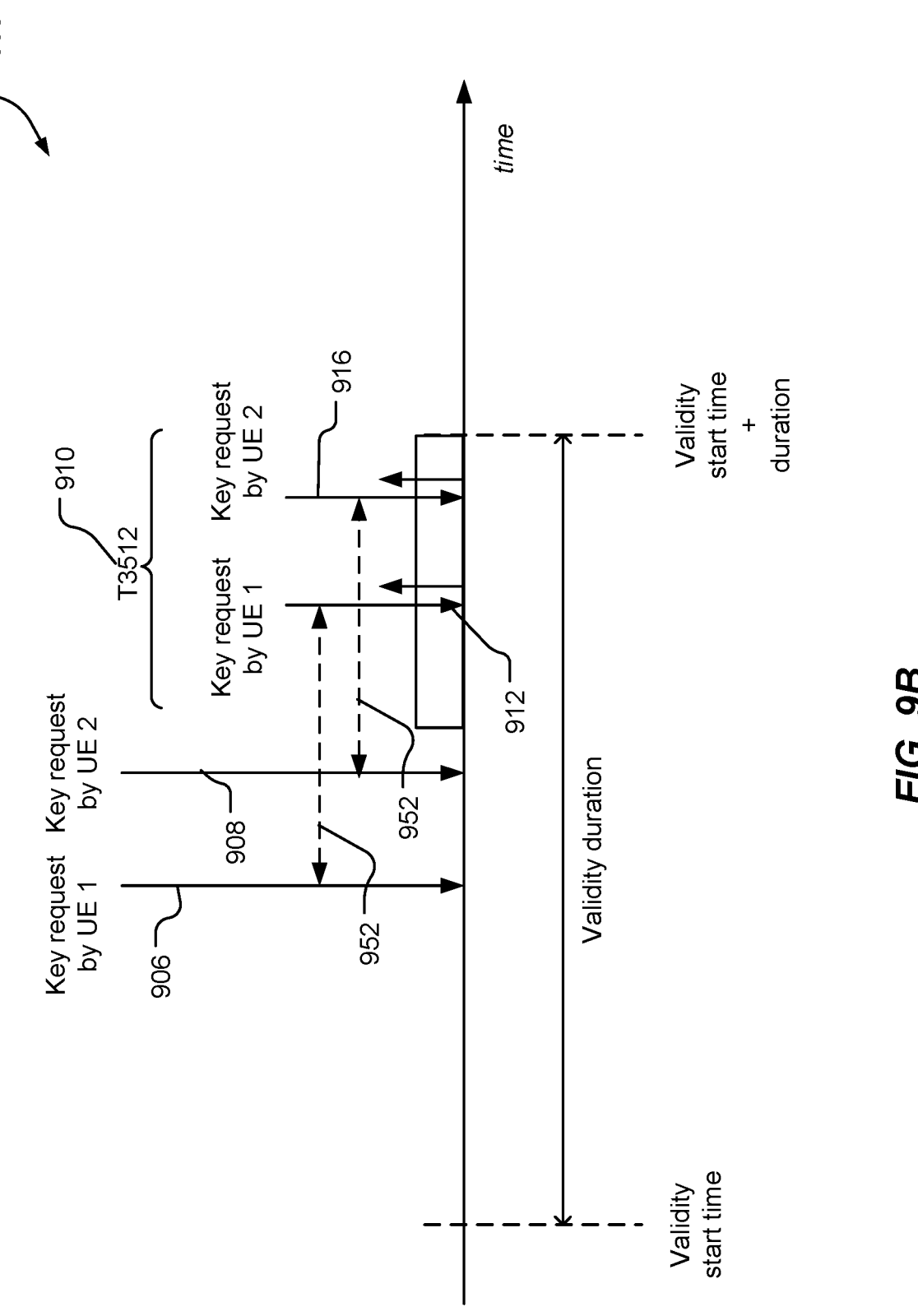
Figure 9C:
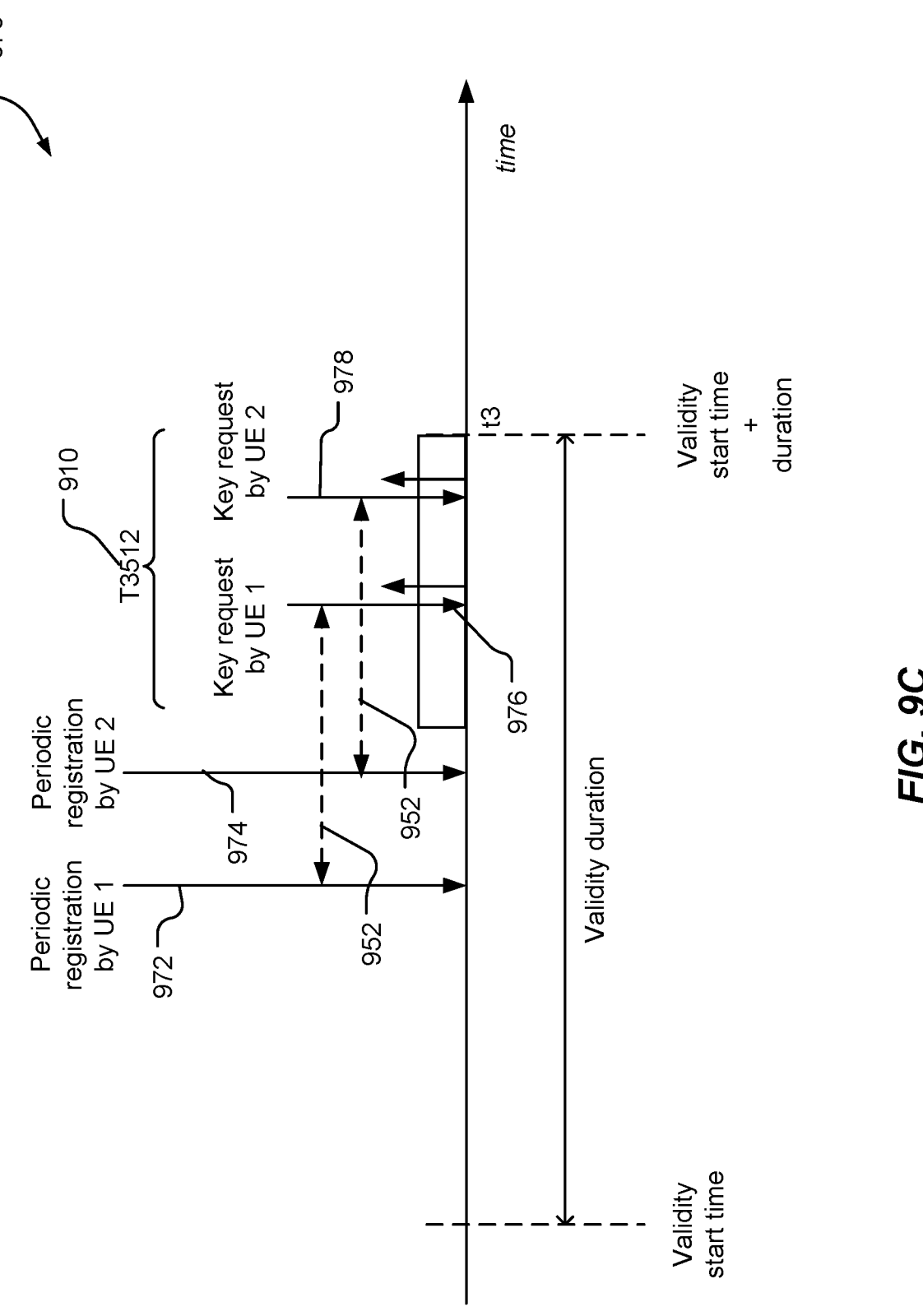

Referring to FIGS. 9A-9C, an example message flow 900 and timing diagrams 950, 970 utilizing a system timer in a cipher key request are shown. In an example, a UE may be configured to set a cipher key request parameter (e.g., CipheringKey=1) in a registration request for every periodic and mobility update after an initial key request if a position session is still active. A network resource (e.g., the AMF 115) may be configured to send a new cipher key only within a preestablished system timer value. For example, the system timer value may be a T3512 timer ahead of the current key expiry, in addition to the current key. If the registration request is outside the T3512 timer value, then network resource may send just the current key. The T3512 is a timer that the UE may use to perform a registration update once to maintain 5GMM context. Therefore, the AMF may take the opportunity to send a new cipher key to a UE and avoid a signaling storm which may occur when the periodic or mobility updates occur close to the cipher key expiration time.

In operation, in an example, a first UE 902 may send a registration request message 906 to an AMF 915 which indicates that a cipher key is required (e.g., CipheringKey=1). The AMF 915 may respond with a registration accept message 907 including a first cipher key, a first validity start time, a first validity duration, and an indication of an T3512 time 910. A second UE 904 that is in the same target area as the first UE 902 may send a registration request 908, and the AMF 915 may respond with a registration accept message 909 including the first cipher key, the first validity start time, the first validity duration, and the indication of the T3512 time 910. At a subsequent time, for example after a time period 952, which within the T3512 time 910, the first UE 902 may send a registration request message 912 prior to expiration of the first cipher key. Since the registration request message 912 is received within the T3512 time 910, the AMF 915 may respond with a registration accept message 914 including a second cipher key, a second validity start time, a second validity duration, and an indication of the T3512 time. The registration accept message 914 may also include the current cipher key. At another time, which is also within the T3512 time 910, the second UE 904 may send a registration request message 916 prior to expiration of the first cipher key. Since the registration request message 916 is received within the T3512 timer value, the AMF 915 may respond with a registration accept message 918 including the second cipher key, the second validity start time, the second validity duration, and the indication of the T3512 time. The registration accept message 918 may also include the current cipher key. If the registration request messages 912, 916 arrived outside of the T3512 time (and before the expiration of the first cipher key), the AMF 915 may be configured to send only the current cipher key information. In an example, the time period 952 between the registration requests 906, 912 sent by the first UE 902, and the registration requests 908, 916 may be equal to the T3512 timer duration.

In an example, referring to FIG. 9C, a UE may be configured to send a cipher key request IE (e.g., CipheringKey=1) in the registration request for every periodic and mobility update within T3512 time of the expiration of a cipher expiry, if a position session is still active. A network resource (e.g., the AMF 115) may be configured to provide a new cipher key only within the T3512 timer ahead of the current key expiration, in addition to the current cipher key information. For example, the first UE 902 may send a periodic registration request message 972 and the second UE 904 may send a periodic registration request message 974 to request a new cipher key. Since the messages 972, 974 are sent prior to the T3512 timer duration 910 extending from the expiration of the current cipher key, the AMF 915 may respond with only the current cipher key information. Subsequent respective periodic registration requests 976, 978 transmitted by the UEs 902, 904 may occur within the T3512 timer value 910 and the AMF 915 may respond with a new cipher key (and optionally the current cipher key).

Figure 10:
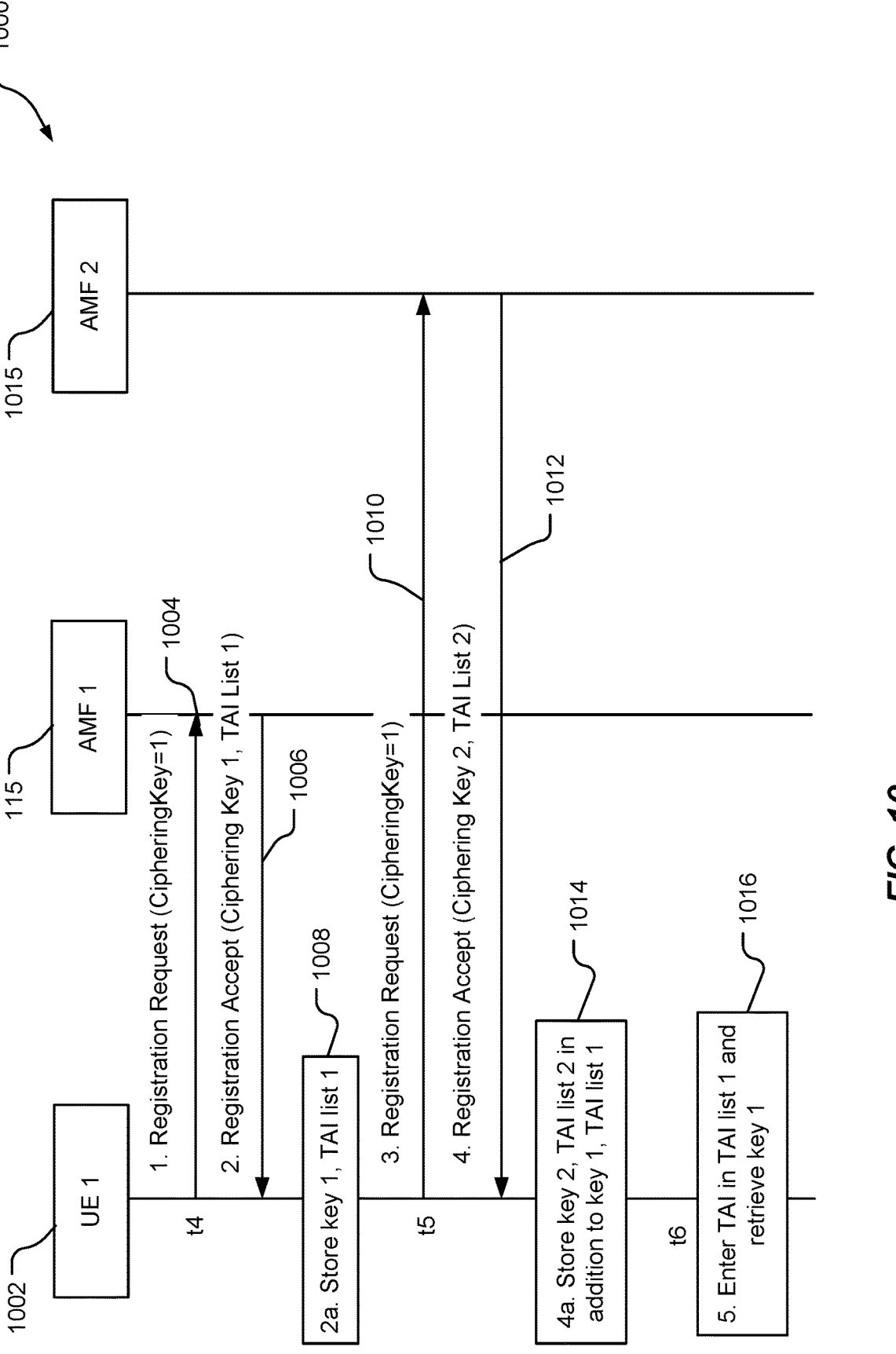
FIG. 10 is an example message flow diagram for obtaining and storing cipher keys associated with tracking areas.

Referring to FIG. 10, with further reference to FIGS. 7A and 7B, a message flow diagram 1000 for obtaining and storing cipher keys associated with tracking areas is shown. In an example, the ping-ponging response described in FIGS. 7A and 7B may be avoided when a UE is configured to store multiple keys for multiple TAI lists. Specifically, if there is ping-ponging in mobility (e.g., changes in locations as depicted in FIG. 7B), the UE may not be required to send a cipher key request again because the cipher key may be already stored for the entered TAI. In an example, if there is no associated cipher key stored in a local data structure, then the UE may be configured to request the cipher key as described in FIG. 7A.

Figure 11:
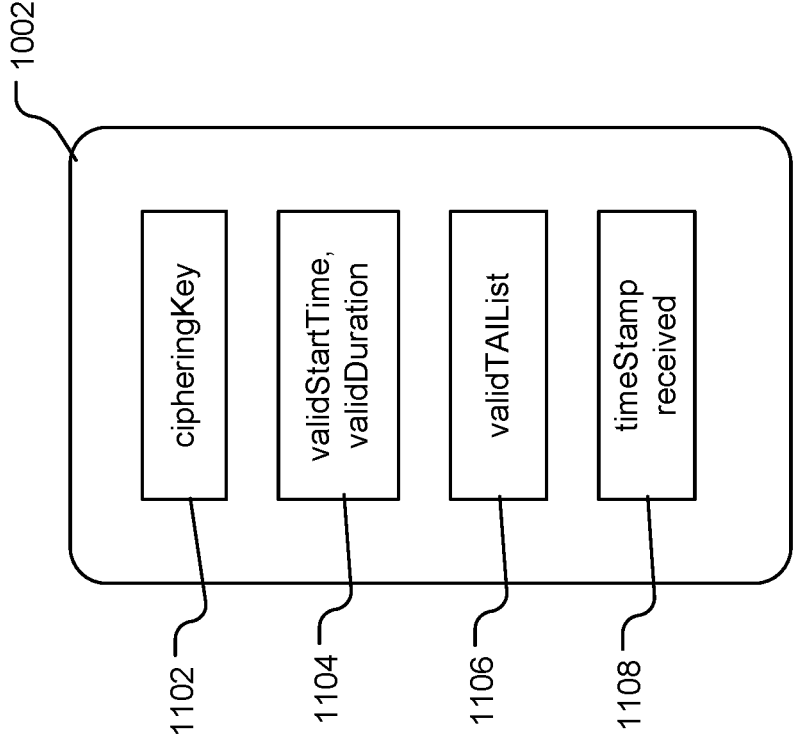
FIG. 11 is a block diagram of a user equipment configured to store a plurality of cipher keys.

In operation, in an example, a UE 1002 may send a registration request message 1004 to a first AMF 115, and the first AMF 115 may provide a registration accept message 1006 with a first cipher key and an indication of the associated TAI. At stage 1008, the UE 1002 may be configured to store the first cipher key and TAI information in a local data structure, or other memory device. The UE 1002 may move to a new TAI and send a registration request message 1010 to a second AMF 1015, and the second AMF 1015 may send a registration accept message 1012 including a second cipher key that is associated with a second TAI. At stage 1014, the UE 1002 may be configured to store the second cipher key and an indication of the association with the second TAI. At stage 1016, the UE 1002 may move back into the first TAI and may retrieve the first cipher key from the local data structure, rather than submitting another registration request to the first AMF 115. Referring to FIG. 11, an example data structure in the UE 1002 is shown. One or more cipher key fields 1102 may be configured to store the cipher keys associated with different TAIs. Time information fields 1104 may be configured to store cipher key start times and duration parameters. A TAI list field 1106 may be configured to store the associated TAI for a cipher key. One or more timestamp fields 1108 may be configured to store expiration time information associated with a cipher key. In an example, the UE 1002 may be configured to delete a cipher key (and the associated data fields) from memory after the cipher key has expired. In an example, the UE 1002 may be configured to store up to N keys and associated TAI lists in a local data structure. The timestamp field 1108 may be included for each cipher key where the timestamp may indicate when the cipher key is received. The UE 1002 may frequently cross multiple TAIs which may cause more keys to be stored than memory space in the data structure. The UE 1002 may be configured to remove the cipher keys with older timestamps. In an example, if a cipher key has expired (e.g., beyond the validity start time plus the duration), the UE 1002 may be configured to remove the expired cipher key from memory.

Figure 12:
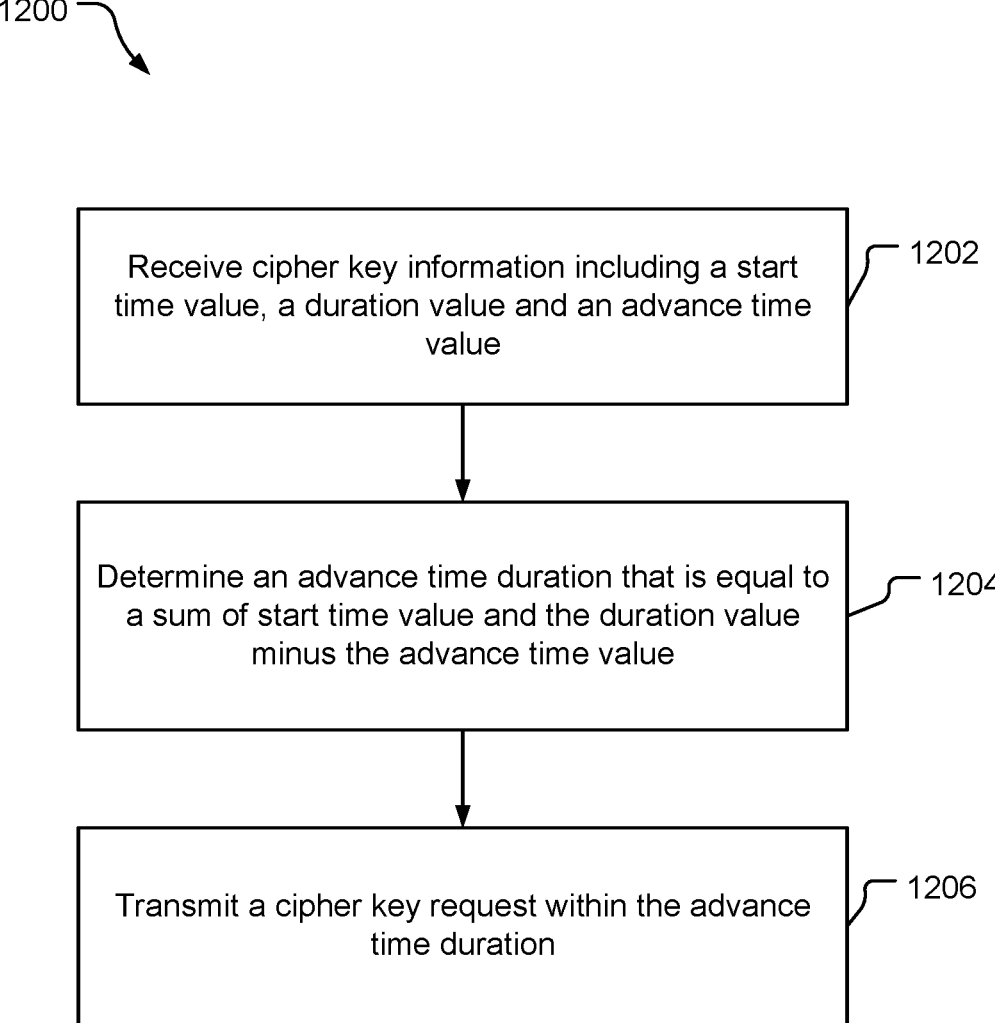
FIG. 12 is a process flow diagram for an example method of transmitting a cipher key request within an advance time duration.

Referring to FIG. 12, with further reference to FIGS. 1-11, a method 1200 for transmitting a cipher key request within an advance time duration includes the stages shown. The method 1200 is, however, an example and not limiting. The method 1200 may be altered, e.g., by having one or more stages added, removed, rearranged, combined, performed concurrently, and/or having one or more single stages split into multiple stages.

At stage 1202, the method includes receiving cipher key information including a start time value, a duration value and an advance time value. The UE 200, including the processors 210 and the transceiver 215, is a means for receiving the cipher key information. In an example, referring to FIG. 8A, the UE 802 may provide a registration request message 806 including an indication that cipher key information is required (e.g., with a CipheringKey IE equal to 1). A network resource, such as the AMF 815 may be configured to provide one or more registration accept messages 807 including the cipher key information, a validity start time (i.e., a start time value), a validity duration (i.e., a duration value), and an advance time value. The registration request and accept messages 806, 807 may utilize NAS protocol messages, or other known messaging protocols configured for signal exchanges between a UE and network resources.

At stage 1204, the method includes determining an advance time duration that is equal to the sum of the start time value and the duration value minus the advance time value. The UE 200, including the processors 200, is a means for determining the advance time duration. In an example, referring to FIG. 8B, the advance time duration may be a duration of the advance time 810 proceeding the expiration of the current cipher key (e.g., the validity start time plus the duration). That is, the advance time duration may be the duration of time before t3 in the timing diagram 850 that is equal to the advance time 810, as depicted in FIG. 8B.

At stage 1206, the method includes transmitting a cipher key request within the advance time duration. The UE 200, including the processors 210 and the transceiver 215, is a means for transmitting the cipher key request. Referring to FIG. 8A, the UE 802 may be configured to transmit the registration request message 812 within the advance time 810. In an example, the transmit time within the advance time duration may be based on a random number (e.g., pseudo-random number) generated by the processors 210 and applied to the advance time duration (e.g., rnd(x), where x=advance time 810). In response to receiving the registration request message 812, the network (e.g., AMF 815) may send information for a new cipher key. The network may also send information for the current cipher key.

Figure 13:
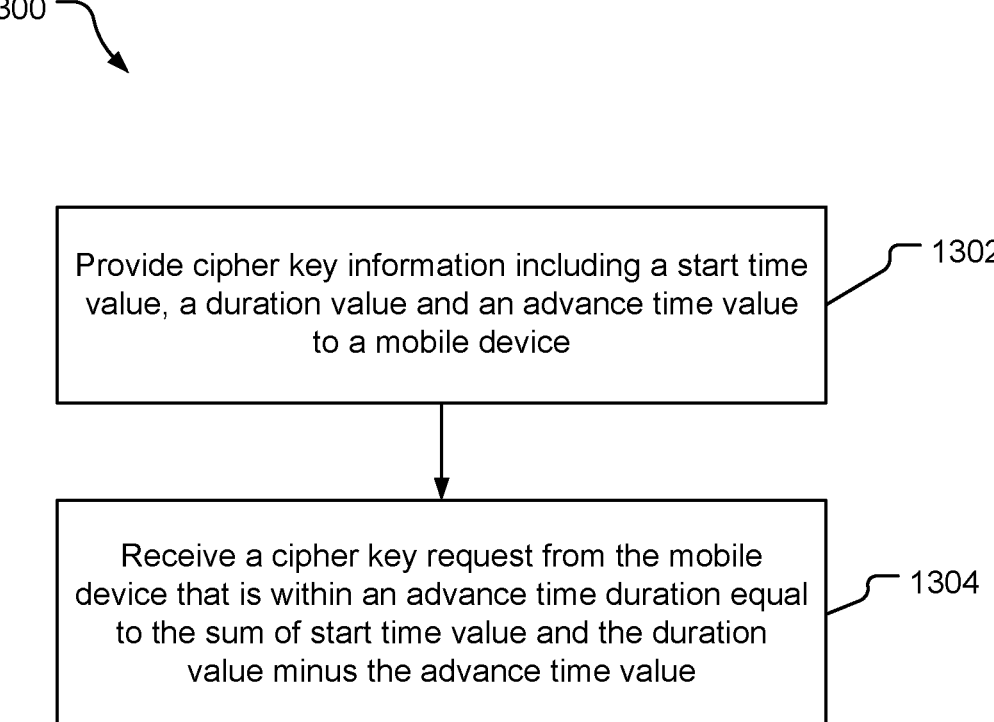
FIG. 13 is a process flow diagram for an example method of receiving a cipher key request within an advance time duration.

Referring to FIG. 13, with further reference to FIGS. 1-11, a method 1300 for receiving a cipher key request within an advance time duration includes the stages shown. The method 1300 is, however, an example and not limiting. The method 1300 may be altered, e.g., by having one or more stages added, removed, rearranged, combined, performed concurrently, and/or having one or more single stages split into multiple stages.

At stage 1302, the method includes providing cipher key information including a start time value, a duration value and an advance time value to a mobile device. The AMF 115, including the processor 410 and the transceiver 415, is a means for providing the cipher key information. In an example, referring to FIG. 8A, a mobile device (e.g., the UE 802) may provide a registration request message 806 including an indication that cipher key information is required (e.g., with a CipheringKey IE equal to 1). The AMF 815 may be configured to provide one or more registration accept messages 807 including the cipher key information, a validity start time (i.e., a start time value), a validity duration (i.e., a duration value), and an advance time value. The registration request and accept messages 806, 807 may utilize NAS protocol messages, or other known messaging protocols configured for signal exchanges between a UE and network resources.

At stage 1304, the method includes receiving a cipher key request from the mobile device that is within an advance time duration that is equal to the sum of the start time value and the duration value minus the advance time value. The AMF 115, including the processor 410 and the transceiver 415, is a means for receiving the cipher key request. In an example, referring to FIG. 8B, the advance time duration may be a duration of the advance time 810 proceeding the expiration of the current cipher key (e.g., the validity start time plus the duration). That is, the advance time duration may be the duration of time before t3 in the timing diagram 850 that is equal to the advance time 810, as depicted in FIG. 8B. The mobile device (e.g., the UE 802) may be configured to transmit the registration request message 812 within the advance time 810. In an example, the transmit time within the advance time duration may be based on a random number (e.g., pseudo-random number) generated by the mobile device and applied to the advance time duration. In an example, the AMF 815 may be configured to generate the random number and provide the random number with the cipher key information (e.g., in a registration accept message). In response to receiving the registration request message 812, the AMF 815 may send information for a new cipher key. The AMF 815 may also send information for the current cipher key in response to a registration request message.

Referring to FIG. 14, with further reference to FIGS. 1-11, a method 1400 for transmitting cipher key values based on a timer boundary value duration includes the stages shown. The method 1400 is, however, an example and not limiting. The method 1400 may be altered, e.g., by having one or more stages added, removed, rearranged, combined, performed concurrently, and/or having one or more single stages split into multiple stages. The method 1400 may be performed be a network resource, such as a server 400. For example, in the communication system 100, the network resource may be the AMF 115.

At stage 1402, the method includes receiving a cipher key request from a mobile device during an active positioning session. The AMF 115, including the processor 410 and the transceiver 415, is a means for receiving the cipher key request. In an example, referring to FIG. 9A, the UE 902 may provide a registration request message 906 including an indication that cipher key information is required (e.g., with a CipheringKey IE equal to 1). The registration request message 906 may utilize NAS protocol messages, or other known messaging protocols configured for signal exchanges between a UE and network resources. In an example, referring to FIG. 9C, the cipher key request may be included in one or more periodic registration messages utilized by the network for mobility management.

At stage 1404, the method includes determining an expiration time value for a first cipher key being utilized by the mobile device. The AMF 115, including the processor 410, is a means for determining the expiration time value. In an example, the communication system 100 may be configured with cipher key validity durations associated with posSIBs. The validity durations may be in the order of seconds, minutes or hours based on network factors such as the number of mobile devices in a tracking area. The expiration time value may be expressed as a validity duration applied to a validity start time (e.g., validity start time plus the duration, as depicted in FIG. 9B).

As stage 1406, the method includes determining a timer boundary value equal to the expiration time value minus a timer value. The AMF 115, including the processor 410, is a means for determining the timer boundary value. Referring to FIG. 9B, the timer boundary value is equal to the expiration time of the current cipher key (e.g., the validity start time plus the validity duration associated with the first cipher key) minus the T3512 time 910. The T3512 time 910 may be other timer values utilized by the communication system 100, and the timer boundary value may vary based on the timer values. In an example, the timer value may be the advance time parameter (e.g., the advance time 810) as described in FIGS. 8A and 8B.

At stage 1408, the method includes transmitting the first cipher key to the mobile device in response to the cipher key request being received before the timer boundary value. The AMF 115, including the processor 410 and the transceiver 415, is a means for transmitting the first cipher key. The cipher key request may be, for example, the registration request message 906 or the periodic registration message 972 which are received by the AMF 915 prior to the timer boundary value (e.g., before the T3512 timer 910, or the advance time 810). The AMF 915 may be configured to send the current cipher key information (e.g., the first cipher key) when the cipher key request is received outside of the timer value.

At stage 1410, the method includes transmitting a second cipher key to the mobile device in response to the cipher key request being received after the timer boundary value. The AMF 115, including the processor 410 and the transceiver 415, is a means for transmitting the second cipher key. The cipher key request may be, for example, the registration request message 912 or the periodic registration message 976 which are received by the AMF 915 after the timer boundary value (e.g., during the T3512 timer 910, the advance time 810). The AMF 915 may be configured to send new cipher key information (e.g., the second cipher key) when the cipher key request is received during the timer value.

Referring to FIG. 15, with further reference to FIGS. 1-11, a method 1500 for transmitting a mobility update including a cipher key request includes the stages shown. The method 1500 is, however, an example and not limiting. The method 1500 may be altered, e.g., by having one or more stages added, removed, rearranged, combined, performed concurrently, and/or having one or more single stages split into multiple stages.

At stage 1502, the method includes determining an expiration time value for a first cipher key. A UE 200, including the processors 210 and the transceiver 215, is a means for determining the expiration time value. In an example, the communication system 100 may be configured with cipher key validity durations associated with posSIBs. The validity durations may be in the order of seconds, minutes or hours based on network factors such as the number of mobile devices in a tracking area. The expiration time value may be expressed as a validity duration applied to a validity start time (e.g., validity start time plus the duration, as depicted in FIG. 9B). A UE may be configure to receive information associated with the first cipher key in response to a sending a registration request or other mobility update including an indication that cipher key information is required (e.g., with a CipheringKey IE equal to 1).

As stage 1504, the method includes determining a timer boundary value equal to the expiration time value minus a timer value. A UE 200, including the processors 210, is a means for determining the timer boundary value. Referring to FIG. 9B, the timer boundary value may be equal to the expiration time of the current cipher key (e.g., the validity start time plus the validity duration associated with the first cipher key) minus the T3512 time 910. The T3512 time 910 may be other timer values utilized by the communication system 100, and the timer boundary value may vary based on the timer values. For example, the timer value may be the advance time 810.

At stage 1506, the method includes transmitting a mobility update including a cipher key request at a time between the timer boundary value and the expiration time value. The UE 200, including the processors 210 and the transceiver 215, is a means for transmitting the mobility update. In an example, referring to FIG. 9C, the UE 902 may be configured to transmit periodic mobility updates including an IE to indicate that a cipher key is required (e.g., CipherKey=1). When the mobility update is transmitted within the timer value 910 (e.g., the key request 976). The network may be configured to respond with a registration accept message including cipher key information for a new cipher key. Information for the first cipher key may also be included.

Referring to FIG. 16, with further reference to FIGS. 1-11, a method 1600 for receiving positioning information from a plurality of base stations includes the stages shown. The method 1600 is, however, an example and not limiting. The method 1600 may be altered, e.g., by having one or more stages added, removed, rearranged, combined, performed concurrently, and/or having one or more single stages split into multiple stages.

At stage 1602, the method includes receiving and storing a first cipher key associated with a first location. A UE 200, including processors 210, memory 211, and transceiver 215, are a means for receiving and storing the first cipher key. Referring to FIG. 7B, a UE may receive cipher key information including a validity start time, a validity duration, and associated TAI list information. For example, referring to FIG. 11, cipher keys associated with different TAIs may persist in one or more cipher key fields 1102. Time information fields 1104 may be configured to store cipher key start times and duration parameters. A TAI list field 1106 may be configured to store the associated TAI for a cipher key. The timestamp field 1108 may be included for each cipher key where the timestamp may indicate when the cipher key is received.

At stage 1604, the method includes receiving and storing a second cipher key associated with a second location. The UE 200, including processors 210, memory 211, and transceiver 215, are a means for receiving and storing the second cipher key. In an example, referring to FIG. 10, the UE 1002 may be configured to send a registration request message 1010 to the second AMF 1015 in response to the UE 1002 moving into the tracking area associated with the second AMF 1015. Other channel conditions may also cause a network to switch a non-moving UE to a neighboring tracking area. The second cipher key may be stored in a data structure such as described in FIG. 11.

At stage 1606, the method includes receiving encrypted positioning information from a base station. The UE 200, including processors 210, memory 211, and transceiver 215, are a means for receiving the encrypted positioning information. In an example, referring to FIG. 5, the UE 505 is configured to receive the posSIBs 508 transmitted from one or more base stations (e.g., gNBs, TRPs) in the tracking area. The posSIBs may be transmitted via RRC protocols or other OTH messaging techniques. In an example, a UE may receive GNSS assistance data (or assistance data for terrestrial navigation techniques) from one or more posSIBs, rather than via a unicast connection.

At stage 1608, the method includes decrypting the positioning information with the first cipher key in response to the base station being associated with the first location. The UE 200, including processors 210, memory 211, and transceiver 215, are a means for decrypting the positioning information. The first cipher key is associated with a first TAI and the posSIBs transmitted by the base stations (e.g., gNBs) in the first tracking area will utilize an encryption associated with the first cipher key, which is stored in the memory at stage 1602.

At stage 1610, the method includes decrypting the positioning information with the second cipher key in response to the base station being associated with the second location. The UE 200, including processors 210, memory 211, and transceiver 215, are a means for decrypting the positioning information. The second cipher key is associated with a second TAI and the posSIBs transmitted by the base stations (e.g., gNBs) in the second tracking area will utilize an encryption associated with the second cipher key, which is stored in the memory at stage 1604.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for transmitting a cipher key request, comprising: receiving cipher key information including a start time value, a duration value, and an advance time value; determining an advance time duration that is equal to a sum of the start time value and the duration value minus the advance time value; and transmitting the cipher key request within the advance time duration.

Clause 2. The method of clause 1 further comprising determining a random time within the advance time duration and transmitting the cipher key request based at least in part on the random time.

Clause 3. The method of clause 1 wherein the cipher key information is received via one or more non-access stratum (NAS) messages.

Clause 4. The method of clause 1 wherein the advance time duration is equal to a pre-established timer value in a communication system.

Clause 5. The method of clause 4 wherein the pre-established timer value is based on a T3512 timer.

Clause 6. The method of clause 1 further comprising receiving additional cipher key information in response to transmitting the cipher key request within the advance time duration.

Clause 7. The method of clause 6 further comprising: receiving an encrypted positioning system information block; and decrypting the encrypted positioning system information block based at least in part on the additional cipher key information.

Clause 8. The method of clause 6 further comprising: storing the cipher key information in a data structure; and storing the additional cipher key information in the data structure.

Clause 9. The method of clause 1 further comprising: transmitting the cipher key request prior to the advance time duration; and receiving the cipher key information including the start time value, the duration value, and the advance time value.

Clause 10. The method of clause 1 wherein the cipher key information is associated with a tracking area.

Clause 11. A method for receiving positioning information from a plurality of base stations, comprising: receiving and storing a first cipher key associated with a first location; receiving and storing a second cipher key associated with a second location; receiving encrypted positioning information from a base station; decrypting the encrypted positioning information with the first cipher key in response to the base station being associated with the first location; and decrypting the encrypted positioning information with the second cipher key in response to the base station being associated with the second location.

Clause 12. The method of clause 11 wherein the first location is a first tracking area and the second location is a second tracking area.

Clause 13. The method of clause 11 wherein the first cipher key is associated with a first tracking area identity (TAI) and the second cipher key is associated with a second tracking area identity (TAI).

Clause 14. The method of clause 11 wherein storing the first cipher key includes storing a first valid start time, a first duration time, a first TAI list, and a first time stamp based on when the first cipher key is received in a data structure, and storing the second cipher key includes storing a second valid start time, a second duration time, a second TAI list, and a second time stamp based on when the second cipher key is received in the data structure.

Clause 15. The method of clause 14 further comprising removing the first cipher key from the data structure based at least in part on the first time stamp, or removing the second cipher key from the data structure based at least in part on the second time stamp.

Clause 16. An apparatus, comprising: a memory; at least one transceiver; at least one processor communicatively coupled to the memory and the at least one transceiver, and configured to: receive cipher key information including a start time value, a duration value, and an advance time value; determine an advance time duration that is equal to a sum of the start time value and the duration value minus the advance time value; and transmit a cipher key request within the advance time duration.

Clause 17. The apparatus of clause 16 wherein the at least one processor is further configured to determine a random time within the advance time duration and to transmit the cipher key request based at least in part on the random time.

Clause 18. The apparatus of clause 16 wherein the at least one processor is further configured to receive the cipher key information via one or more non-access stratum (NAS) messages.

Clause 19. The apparatus of clause 16 wherein the advance time duration is equal to a pre-established timer value in a communication system.

Clause 20. The apparatus of clause 19 wherein the pre-established timer value is based on a T3512 timer.

Clause 21. The apparatus of clause 16 wherein the at least one processor is further configured to receive additional cipher key information in response to transmitting the cipher key request within the advance time duration.

Clause 22. The apparatus of clause 21 wherein the at least one processor is further configured to: receive an encrypted positioning system information block; and decrypt the encrypted positioning system information block based at least in part on the additional cipher key information.

Clause 23. The apparatus of clause 21 wherein the at least one processor is further configured to: store the cipher key information in a data structure; and store the additional cipher key information in the data structure.

Clause 24. The apparatus of clause 16 wherein the at least one processor is further configured to: transmit the cipher key request prior to the advance time duration; and receive the cipher key information including the start time value, the duration value, and the advance time value.

Clause 25. The apparatus of clause 16 wherein the cipher key information is associated with a tracking area.

Clause 26. An apparatus, comprising: a memory; at least one transceiver; at least one processor communicatively coupled to the memory and the at least one transceiver, and configured to: receive and store a first cipher key associated with a first location; receive and store a second cipher key associated with a second location; receive encrypted positioning information from a base station; decrypt the encrypted positioning information with the first cipher key in response to the base station being associated with the first location; and decrypt the encrypted positioning information with the second cipher key in response to the base station being associated with the second location.

Clause 27. The apparatus of clause 26 wherein the first location is a first tracking area and the second location is a second tracking area.

Clause 28. The apparatus of clause 26 wherein the first cipher key is associated with a first tracking area identity (TAI) and the second cipher key is associated with a second tracking area identity (TAI).

Clause 29. The apparatus of clause 26 wherein the at least one processor is further configured to store a first valid start time, a first duration time, a first TAI list, and a first time stamp based on when the first cipher key is received in a data structure, and store a second valid start time, a second duration time, a second TAI list, and a second time stamp based on when the second cipher key is received in the data structure.

Clause 30. The apparatus of clause 29 wherein the at least one processor is further configured to remove the first cipher key from the data structure based at least in part on the first time stamp, or remove the second cipher key from the data structure based at least in part on the second time stamp.

Clause 31. An apparatus for transmitting a cipher key request, comprising: means for receiving cipher key information including a start time value, a duration value, and an advance time value; means for determining an advance time duration that is equal to a sum of the start time value and the duration value minus the advance time value; and means for transmitting the cipher key request within the advance time duration.

Clause 32. An apparatus for receiving positioning information from a plurality of base stations, comprising: means for receiving and storing a first cipher key associated with a first location; means for receiving and storing a second cipher key associated with a second location; means for receiving encrypted positioning information from a base station; means for decrypting the encrypted positioning information with the first cipher key in response to the base station being associated with the first location; and means for decrypting the encrypted positioning information with the second cipher key in response to the base station being associated with the second location.

Clause 33. A non-transitory processor-readable storage medium comprising processor-readable instructions configured to cause one or more processors to transmit a cipher key request, comprising code for: receiving cipher key information including a start time value, a duration value, and an advance time value; determining an advance time duration that is equal to a sum of the start time value and the duration value minus the advance time value; and transmitting the cipher key request within the advance time duration.

Clause 34. A non-transitory processor-readable storage medium comprising processor-readable instructions configured to cause one or more processors to receive positioning information from a plurality of base stations, comprising code for: receiving and storing a first cipher key associated with a first location; receiving and storing a second cipher key associated with a second location; receiving encrypted positioning information from a base station; decrypting the encrypted positioning information with the first cipher key in response to the base station being associated with the first location; and decrypting the encrypted positioning information with the second cipher key in response to the base station being associated with the second location.

The invention claimed is:

1. A method for transmitting a cipher key request, performed by a user equipment, comprising:
   receiving first cipher key information including a first cipher key and an indication of a first validity time duration during which the first cipher key is valid;
   receiving an indication of an advance time duration, that is a portion of the first validity time duration, during which the cipher key request is transmitted in order to receive second cipher key information, including a second cipher key, before a second validity time during which the second cipher key is valid;
   transmitting a first cipher key request prior to the advance time duration;
   receiving, in response to transmitting the first cipher key request prior to the advance time duration, a response that includes the first cipher key information without including the second cipher key information;
   transmitting a second cipher key request within the advance time duration; and receiving, in response to transmitting the second cipher key request within the advance time duration, a response that includes the second cipher key information.

2. The method of claim 1 further comprising determining a random time within the advance time duration and transmitting the cipher key request based at least in part on the random time.

3. The method of claim 1 wherein the cipher key information is received via one or more non-access stratum (NAS) messages.

4. The method of claim 1 wherein the advance time duration is equal to a pre-established timer value in a communication system.

5. The method of claim 4 wherein the pre-established timer value is based on a T3512 timer.

6. The method of claim 1 further comprising receiving additional cipher key information in response to transmitting the cipher key request within the advance time duration.

7. The method of claim 6 further comprising:
   receiving an encrypted positioning system information block; and
   decrypting the encrypted positioning system information block based at least in part on the additional cipher key information.

8. The method of claim 6 further comprising:
   storing the cipher key information in a data structure; and
   storing the additional cipher key information in the data structure.

9. The method of claim 1 wherein the cipher key information is associated with a tracking area.

10. A method for receiving positioning information from a plurality of base stations, comprising:
   requesting, receiving, and storing, by a mobile device, a first cipher key associated with a first location as a stored first cipher key;
   determining that the mobile device has left a first location and entered a second location that is different from the first location;
   requesting, receiving, and storing, by the mobile device, a second cipher key associated with the second location based on the mobile device determining that the mobile device has left the first location and entered the second location;
   determining that the mobile device has re-entered the first location;
   receiving, at the mobile device, encrypted positioning information from a base station;
   decrypting, by the mobile device and based on the mobile device determining that the mobile device has re-entered the first location, the encrypted positioning information with the stored first cipher key to determine decrypted positioning information without the mobile device re-requesting the first cipher key;
   measuring, by the mobile device, positioning signals using the decrypted positioning information; and
   determining a position of the mobile device based on measurements of the positioning signals.

11. The method of claim 10 wherein the first location is a first tracking area and the second location is a second tracking area.

12. The method of claim 10 wherein the first cipher key is associated with a first tracking area identity (TAI) and the second cipher key is associated with a second tracking area identity (TAI).

13. The method of claim 10 wherein storing the first cipher key includes storing a first valid start time, a first duration time, a first TAI list, and a first time stamp based on when the first cipher key is received in a data structure, and storing the second cipher key includes storing a second valid start time, a second duration time, a second TAI list, and a second time stamp based on when the second cipher key is received in the data structure.

14. The method of claim 13 further comprising removing the first cipher key from the data structure based at least in part on the first time stamp, or removing the second cipher key from the data structure based at least in part on the second time stamp.

15. An apparatus, comprising:
a memory;
at least one transceiver;
at least one processor communicatively coupled to the memory and the at least one transceiver, and configured to:
receive first cipher key information including a first cipher key and an indication of a first validity time duration during which the first cipher key is valid;
receive, via the at least one transceiver, an indication of an advance time duration, that is a portion of the first validity time duration, during which a cipher key request is transmitted in order to receive second cipher key information, including a second cipher key, before a second validity time during which the second cipher key is valid;
transmit a first cipher key request prior to the advance time duration;
receive, in response to transmitting the first cipher key request prior to the advance time duration, a response that includes the first cipher key information without including the second cipher key information;
transmit a second cipher key request within the advance time duration; and
receive, in response to transmitting the second cipher key request within the advance time duration, a response that includes the second cipher key information.

16. The apparatus of claim 15 wherein the at least one processor is further configured to determine a random time within the advance time duration and to transmit the cipher key request based at least in part on the random time.

17. The apparatus of claim 15 wherein the at least one processor is further configured to receive the cipher key information via one or more non-access stratum (NAS) messages.

18. The apparatus of claim 15 wherein the advance time duration is equal to a pre-established timer value in a communication system.

19. The apparatus of claim 18 wherein the pre-established timer value is based on a T3512 timer.

20. The apparatus of claim 15 wherein the at least one processor is further configured to receive additional cipher key information in response to transmitting the cipher key request within the advance time duration.

21. The apparatus of claim 20 wherein the at least one processor is further configured to:
receive an encrypted positioning system information block; and decrypt the encrypted positioning system information block based at least in part on the additional cipher key information.

22. The apparatus of claim 20 wherein the at least one processor is further configured to:
store the cipher key information in a data structure; and
store the additional cipher key information in the data structure.

23. The apparatus of claim 15 wherein the cipher key information is associated with a tracking area.

24. An apparatus, comprising:
a memory;
at least one transceiver;
at least one processor communicatively coupled to the memory and the at least one transceiver, and configured to:
request, receive, and store a first cipher key associated with a first location as a stored first cipher key;
determine that the mobile device has left a first location and entered a second location that is different from the first location;
request, receive, and store a second cipher key associated with the second location based on the mobile device determining that the mobile device has left the first location and entered the second location;
determine that the mobile device has re-entered the first location;
receive encrypted positioning information from a base station;
decrypt, based on the mobile device determining that the mobile device has re-entered the first location, the encrypted positioning information with the stored first cipher key to determine decrypted positioning information without re-requesting the first cipher key;
measure positioning signals, received via the at least one transceiver, using the decrypted positioning information; and
determine a position of the apparatus based on measurements of the positioning signals.

25. The apparatus of claim 24 wherein the first location is a first tracking area and the second location is a second tracking area.

26. The apparatus of claim 24 wherein the first cipher key is associated with a first tracking area identity (TAI) and the second cipher key is associated with a second tracking area identity (TAI).

27. The apparatus of claim 24 wherein the at least one processor is further configured to store a first valid start time, a first duration time, a first TAI list, and a first time stamp based on when the first cipher key is received in a data structure, and store a second valid start time, a second duration time, a second TAI list, and a second time stamp based on when the second cipher key is received in the data structure.

28. The apparatus of claim 27 wherein the at least one processor is further configured to remove the first cipher key from the data structure based at least in part on the first time stamp, or remove the second cipher key from the data structure based at least in part on the second time stamp.

* * * * *